US010681235B2

(12) United States Patent
Date et al.

(10) Patent No.: US 10,681,235 B2
(45) Date of Patent: Jun. 9, 2020

(54) IMAGE RECORDING DEVICE WITH A READER AND PROCESSOR FOR CALIBRATING THE READER

(71) Applicant: Konica Minolta, Inc., Tokyo (JP)

(72) Inventors: Masakazu Date, Hino (JP); Yutaka Hosono, Sagamihara (JP); Toshiyuki Mizutani, Hino (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 16/086,855

(22) PCT Filed: Mar. 3, 2017

(86) PCT No.: PCT/JP2017/008493
§ 371 (c)(1),
(2) Date: Sep. 20, 2018

(87) PCT Pub. No.: WO2017/169508
PCT Pub. Date: Oct. 5, 2017

(65) Prior Publication Data
US 2019/0109957 A1 Apr. 11, 2019

(30) Foreign Application Priority Data
Mar. 28, 2016 (JP) .................................. 2016-063792

(51) Int. Cl.
H04N 1/00 (2006.01)
B41J 29/393 (2006.01)
(Continued)

(52) U.S. Cl.
CPC ...... H04N 1/00819 (2013.01); B41J 2/16579 (2013.01); B41J 2/16585 (2013.01);
(Continued)

(58) Field of Classification Search
CPC ........... H04N 1/00819; H04N 1/00814; H04N 1/02815; H04N 1/19; H04N 1/00045; H04N 1/00055; H04N 1/00087; B41J 2/2142
(Continued)

(56) References Cited

U.S. PATENT DOCUMENTS 7,334,859 B2 2/2008 Kojima
2004/0179242 A1* 9/2004 Nakaya ............... H04N 1/4076
358/461
(Continued)

FOREIGN PATENT DOCUMENTS

EP 0918260 A2 5/1999
EP 0964569 A2 12/1999
(Continued)

OTHER PUBLICATIONS

International Search Report dated Jun. 6, 2017 for PCT/JP2017/008493 and English translation.
(Continued)

Primary Examiner — Jamares Q Washington
(74) Attorney, Agent, or Firm — Lucas & Mercanti, LLP

(57) ABSTRACT

An image recording device includes a recorder, a reader and a hardware processor. The recorder records an image on a recording medium. The reader reads, with an imaging element, a surface of the recording medium and a surface of a predetermined reference member. The hardware processor calibrates the reader for a value to be detected by the imaging element, based on a reading result of the reading of the surface of the reference member. Further, the hardware processor performs the calibration in at least one of: a case where a type of the image to be recorded on the recording medium satisfies a predetermined image type condition; and a case where a predetermined reading influence factor which
(Continued)

affects a reading result of the reading of the surface of the recording medium satisfies a predetermined reading influence factor condition.

17 Claims, 12 Drawing Sheets

(51) Int. Cl.

| | |
|---|---|
| *H04N 1/401* | (2006.01) |
| *H04N 1/19* | (2006.01) |
| *B41J 2/21* | (2006.01) |
| *G03G 21/00* | (2006.01) |
| *B41J 2/165* | (2006.01) |
| *B41J 29/38* | (2006.01) |
| *H04N 1/028* | (2006.01) |
| *B41J 25/00* | (2006.01) |

(52) U.S. Cl.
CPC ........... *B41J 2/2142* (2013.01); *B41J 2/2146* (2013.01); *B41J 29/38* (2013.01); *B41J 29/393* (2013.01); *G03G 21/00* (2013.01); *H04N 1/00814* (2013.01); *H04N 1/02815* (2013.01); *H04N 1/19* (2013.01); *H04N 1/401* (2013.01); *B41J 2025/008* (2013.01); *H04N 1/0005* (2013.01); *H04N 1/00045* (2013.01); *H04N 1/00055* (2013.01); *H04N 1/00087* (2013.01); *H04N 1/02845* (2013.01); *H04N 2201/0094* (2013.01)

(58) Field of Classification Search
USPC .................. 358/1.15, 516, 518, 406, 504
See application file for complete search history.

(56) References Cited

U.S. PATENT DOCUMENTS

| | | | | |
|---|---|---|---|---|
| 2005/0024410 A1* | 2/2005 | Subirada | ............... | H04N 1/23 347/16 |
| 2005/0185227 A1* | 8/2005 | Thompson | ......... | H04N 1/00002 358/474 |
| 2007/0201112 A1* | 8/2007 | Motamed | ........... | H04N 1/00002 358/504 |
| 2013/0016169 A1 | 1/2013 | Ohtoshi | | |
| 2013/0077133 A1* | 3/2013 | Tanaka | ..................... | H04N 1/03 358/461 |
| 2015/0244893 A1* | 8/2015 | Tanaka | ..................... | H04N 1/40 358/474 |

FOREIGN PATENT DOCUMENTS

| | | |
|---|---|---|
| JP | H03-38964 A | 2/1991 |
| JP | H04-239879 A | 8/1992 |
| JP | H07-168412 A | 7/1995 |
| JP | H07168412 A | 7/1995 |
| JP | 2009171572 A | 7/2009 |
| JP | 2012070097 A | 4/2012 |
| JP | 2013251707 A | 12/2013 |
| JP | 2014082679 A | 5/2014 |
| WO | 2014208588 A1 | 12/2014 |

OTHER PUBLICATIONS

Written Opinion of the International Searching Authority dated Jun. 6, 2017 from international Application No. PCT/JP2017/008493 and English translation.

European Search Report, EP17774053, dated Mar. 4, 2019, 11 Pages.

CNIPA, Office Action for the corresponding Chinese Patent Application No. 201780019914.14, dated Jul. 25, 2019, with machine English translation (17 pages).

CNIPA, Office Action for the corresponding Chinese Patent Application No. 201780019914.14, dated Dec. 26, 2019, with machine English translation (14 pages).

* cited by examiner

FIG.5
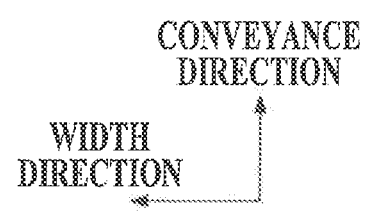
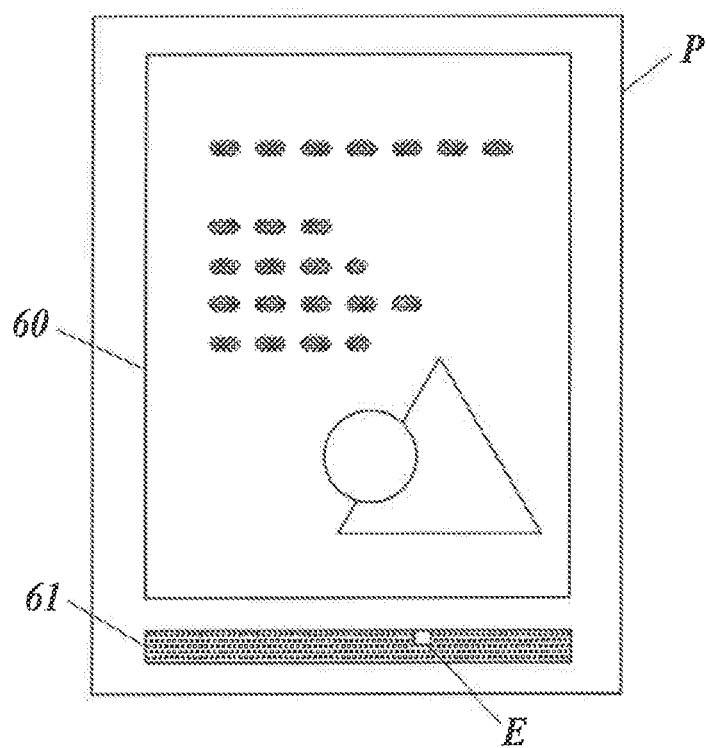

IMAGE RECORDING DEVICE WITH A READER AND PROCESSOR FOR CALIBRATING THE READER

CROSS REFERENCE TO RELATED APPLICATION

This Application is a 371 of PCT/JP2017/008493 filed on Mar. 3, 2017 which, in turn, claimed the priority of Japanese Patent Application No. 2016-063792 filed on Mar. 28, 2016, both applications are incorporated herein by reference.

TECHNICAL FIELD

The present invention relates to an image recording device and a method for controlling an image recording device(s).

BACKGROUND ART

There are conventional image recording devices which record images by fixing color materials, such as toners or ink onto recording media. Among these image recording devices, there is an image recording device which reads a predetermined test image recorded on a recording medium with, as a reader, a line sensor having a plurality of imaging elements, and detects presence or absence of abnormalities in recording elements on the basis of obtained imaged data.

This image recording device calibrates the reader in order to correct sensitivity variation among the imaging elements of the reader and luminous intensity unevenness on recording media due to light sources of the reader. In calibration of the reader, the reader reads a reference member, such as a white plate having a uniform and known reflectance, and a correction value for matching pixel values of obtained imaged data with a predetermined value is calculated. In order that the reader performs every reading properly, the reader is calibrated with predetermined frequency, for example, each time the reader reads a recording medium or reads a predetermined number of recording media. (Refer to, for example, Patent Document 1.)

RELATED ART DOCUMENTS

Patent Documents

Patent Document 1: Japanese Patent Application Publication No. 2012-70097

SUMMARY OF THE INVENTION

Problems to be Solved by the Invention

However, if the frequency of calibration of the reader is determined uniformly, a problem arises that the calibration cannot always be performed at appropriate timings.

Objects of the present invention include providing an image recording device and a method for controlling an image recording device(s) which can calibrate a reader(s) at more appropriate timings.

Means for Solving the Problems

In order to achieve at least one of the above object(s), one aspect of the present invention is an image recording device including:

a recorder which records an image on a recording medium;

a reader which reads, with an imaging element, a surface of the recording medium and a surface of a predetermined reference member;

a calibration unit which calibrates the reader for a value to be detected by the imaging element, based on a reading result of the reading of the surface of the reference member by the reader; and a calibration control unit which causes the calibration unit to perform the calibration in at least one of: a case where a type of the image to be recorded on the recording medium by the recorder satisfies a predetermined image type condition; and a case where a predetermined reading influence factor which affects a reading result of the reading of the surface of the recording medium by the reader satisfies a predetermined reading influence factor condition.

Further, in order to achieve at least one of the above object(s), another aspect of the present invention is a method for controlling an image recording device including a recorder which records an image on a recording medium and a reader which reads, with an imaging element, a surface of the recording medium and a surface of a predetermined reference member, including:

a calibration step of calibrating the reader for a value to be detected by the imaging element, based on a reading result of the reading of the surface of the reference member by the reader, wherein the calibration step is performed in at least one of: a case where a type of the image to be recorded on the recording medium by the recorder satisfies a predetermined image type condition; and a case where a predetermined reading influence factor which affects a reading result of the reading of the surface of the recording medium by the reader satisfies a predetermined reading influence factor condition.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

FIG. 5 shows examples of an ordinary image and a poor discharge detection chart recorded on a recording medium.

EMBODIMENTS FOR CARRYING OUT THE INVENTION

Hereinafter, one or more embodiments of an image recording device and a method for controlling an image recording device(s) of the present invention are described on the basis of the drawings. However, the scope of the invention is not limited to the disclosed embodiments.

Figure 1:
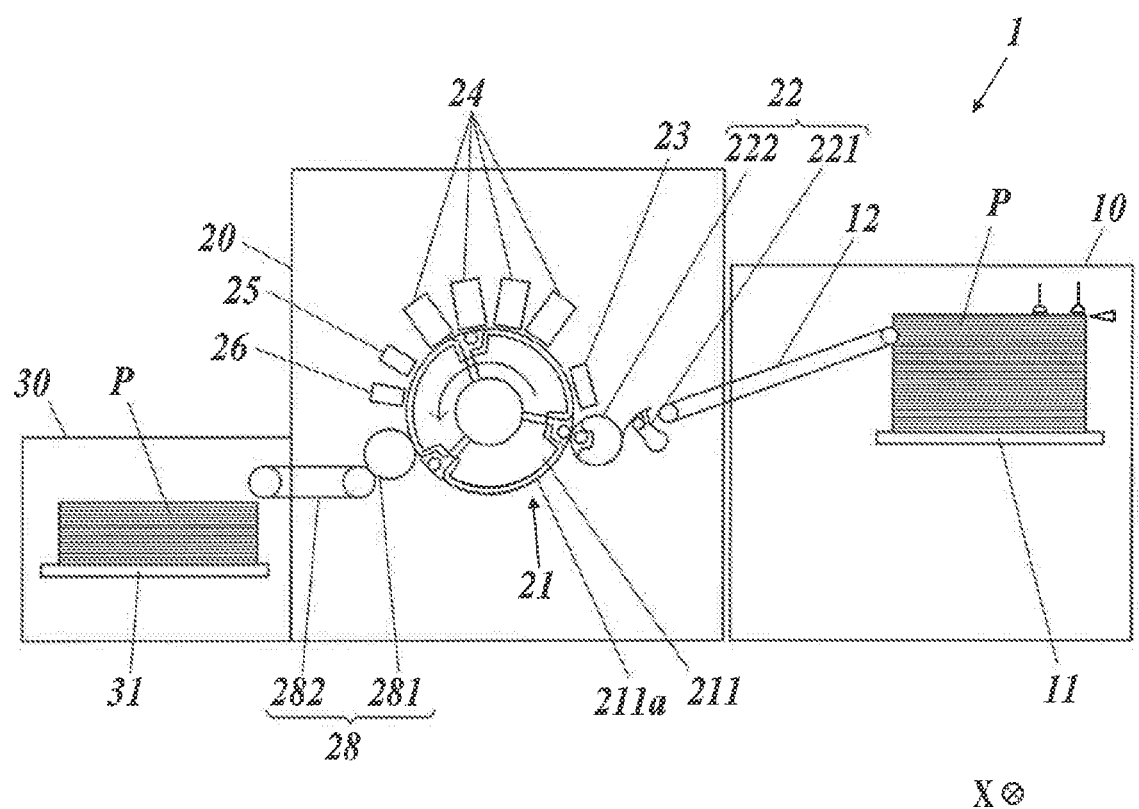
FIG. 1 schematically shows configuration of an inkjet recording device.

FIG. 1 schematically shows configuration of an inkjet recording device 1 which is an embodiment(s) of the present invention.

Figure 4:
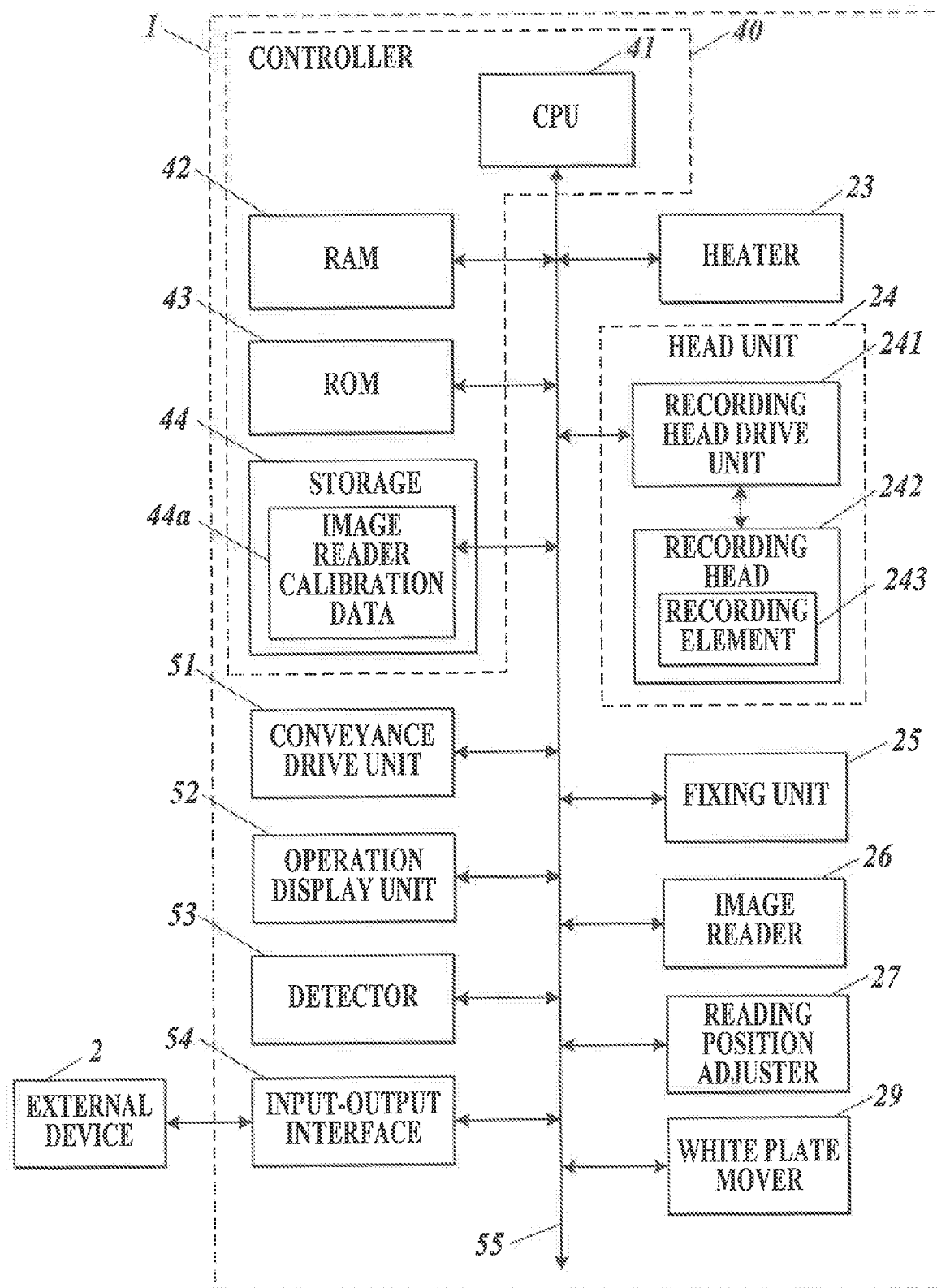
FIG. 4 is a block diagram showing main functional components of the inkjet recording device.

The inkjet recording device 1 (image recording device) includes a sheet feeder 10, an image recorder 20, a sheet receiver 30 and a controller 40 (FIG. 4). Under the control of the controller 40, the inkjet recording device 1 conveys recording media P stored in the sheet feeder 10 to the image recorder 20, records images on the recording media P with the image recorder 20, and conveys the recording media P having the recorded images to the sheet receiver 30. As the recording media P, a variety of media can be used as far as ink landing on the surfaces thereof can be fixed there. Examples thereof include fabrics and sheet-shaped resins in addition to paper exemplified by plain paper and coated paper.

The sheet feeder 10 includes: a sheet feeding tray 11 where the recording media P are stored; and a media supply unit 12 which conveys and supplies the recording media P from the sheet feeding tray 11 to the image recorder 20. The media supply unit 12 includes a ring-shaped belt the inner side of which is supported by two rollers. The media supply unit 12 conveys the recording media P from the sheet feeding tray 11 to the image recorder 20 by rotating the rollers in the state in which the recording media P are placed on the belt.

The image recorder 20 includes a conveyor 21 (conveyor), a first delivery unit 22, a heater 23, head units 24 (recorders), a fixing unit 25, an image reader 26 (reader), and a second delivery unit 28.

The conveyor 21 holds the recording media P placed on a conveyance surface 211a (placement surface) of a cylindrical conveyance drum 211, and performs conveyance operation of conveying the conveyance drum 211 and the recording media P on the conveyance drum 211 in a conveyance direction with the conveyance drum 211 rotating on a rotational shaft (cylindrical shaft) which extends in a width direction (X direction) perpendicular to FIG. 1, thereby whirling round. The conveyance drum 211 has not-shown claw parts and a not-shown suction device to hold the recording media P on the conveyance surface 211a. The recording media P are held on the conveyance surface 211a by the edges of the recording media P being held down with the claw parts and by the recording media P being attracted to the conveyance surface 211a with the suction device. The conveyor 21 is connected to a not-shown conveyance drum motor which rotates the conveyance drum 211, and the conveyance drum 211 rotates an angle proportional to the amount of rotation of the conveyance drum motor.

The first delivery unit 22 delivers, to the conveyor 21, the recording media P received from the media supply unit 12 of the sheet feeder 10. The first delivery unit 22 is arranged between the media supply unit 12 of the sheet feeder 10 and the conveyor 21, and holds and takes up, with a swing arm part 221, one end of each of the recording media P received from the media supply unit 12, and delivers, with a delivery drum 222, the recording media P to the conveyor 21.

The heater 23 is arranged between an arrangement position of the delivery drum 222 and arrangement positions of the head units 24, and heats the recording media P conveyed by the conveyor 21 such that the recording media P have a temperature within a predetermined temperature range. The heater 23 has, for example, an infrared heater and so forth, and causes the infrared heater to generate heat by electrifying the infrared heater on the basis of control signals supplied from a CPU 41 (FIG. 4).

The head units 24 discharge inks from nozzle opening parts provided in ink discharge surfaces facing the conveyance surface 211a of the conveyance drum 211 to the recording media P at appropriate timings according to the rotation of the conveyance drum 211 holding the recording media P, thereby recording images. The head units 24 are arranged such that the ink discharge surfaces and the conveyance surface 211a are separate a predetermined distance. In the inkjet recording device 1 of this embodiment, four head units 24 for four ink colors of yellow (Y), magenta (M), cyan (C) and black (K) are arranged at predetermined intervals to line up in the order of Y, M, C and K from the upstream side in the conveying direction of the recording media P.

Figure 2:
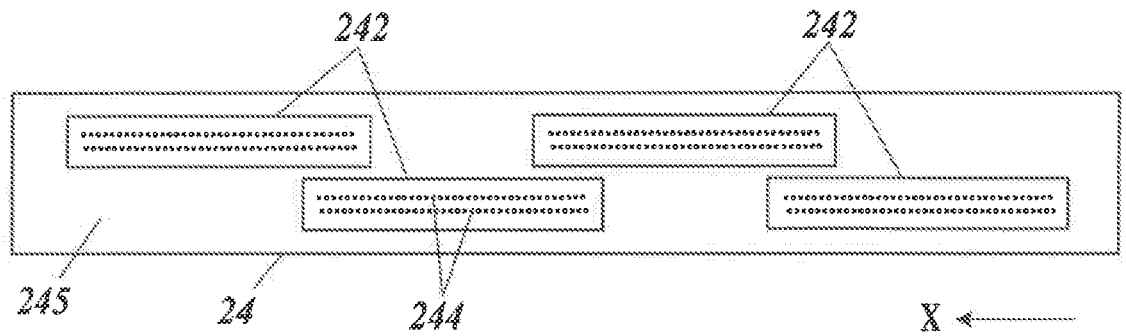
FIG. 2 is a schematic diagram showing configuration of a head unit.

FIG. 2 is a schematic diagram showing configuration of one of the head units 24. In this figure, of the head unit 24, the surface facing the conveyance surface 211a of the conveyance drum 211 is shown.

The head unit 24 includes four recording heads 242 attached to an attachment member 245. Each recording head 242 includes a plurality of recording elements 243 (FIG. 4) each of which includes: a pressure chamber where ink is stored; a piezoelectric element arranged on the wall surface of the pressure chamber; and a nozzle 244. When the recording elements 243 receive drive signals for deforming the piezoelectric elements, the piezoelectric elements deform, and accordingly the pressure chambers deform and the pressures in the pressure chambers change, and ink is discharged from the nozzles which communicate with the pressure chambers. In this embodiment, this ink discharge operation by the recording elements 243 corresponds to recording operation. Each recording head 242 has two nozzle lines of the nozzles 244 which are arranged in the width direction intersecting the conveyance direction of the recording media P (in this embodiment, the direction intersecting the conveyance direction at right angles, i.e. a X direction) at equal intervals. These two nozzle lines are arranged such that the arrangement positions of their nozzles 244 are sifted from one another in the X direction by ½ of an arrangement interval of the nozzles 244 in each nozzle line.

Each recording head 242 could have recording elements which poorly discharge ink (defective recording elements) due to variation in processing in forming the nozzles 244, variation in characteristics of the piezoelectric elements, clogging of the nozzles 244, blocking of the nozzle opening parts by adherence foreign matters, and so forth. Hereinafter, the nozzles 244 from which ink is poorly discharged of the defective recording elements are referred to as defective nozzles. A method for detecting defective nozzles (i.e. a method for detecting defective recording elements) in the inkjet recording device 1 is described below.

The four recording heads 242 are arranged in a houndstooth check such that arrangement areas of the nozzle lines in the X direction are continuous without a break. The arrangement area of the nozzles 244, which are included in each head unit 24, in the X direction covers the width in the X direction of a region where images are recorded on the recording media P, which are conveyed by the conveyor 21. At the time of recording images, the head units 24 are used with their positions fixed with respect to the rotational shaft of the conveyance drum 211. That is, the inkjet recording device 1 is an inkjet recording device employing a single-pass system.

The number of the nozzle lines that each recording head 242 has may be one, or three or more. Further, the number of the recording heads 242 that each head unit 24 has may be three or less, or five or more.

As the ink(s) which is discharged from the nozzles of the recording elements 243, ink which changes between the gel phase and the sol phase according to temperature and is cured by being irradiated with energy rays, such as ultraviolet rays, is used, for example.

In this embodiment, an ink which is a gel at room temperature and solates by heat is used. Each head unit 24 includes a not-shown ink heater which heats the ink stored in the head unit 24. This ink heater operates under the control of the CPU 41, and heats the ink to a temperature at which the ink solates. The recording heads 242 discharge the ink made to solate by heat. When this sol ink is discharged to the recording media P, after the ink droplets land on the recording media P, they quickly gelatinize and solidify on the recording media P by being naturally cooled.

The fixing unit 25 has energy ray emitters arranged so as to cover the width in the X direction of the conveyor 21, and cures and fixes the inks on the recording media P, the inks having been discharged onto the recording media P, by emitting energy rays, such as ultraviolet rays, from the energy ray emitters to the recording media P placed on the conveyor 21. The energy ray emitters of the fixing unit 25 are arranged between the arrangement positions of the head units 24 and the arrangement position of a delivery drum 281 of the second delivery unit 28 so as to be in this order in the conveying direction and face the conveyance surface 211a and be.

The image reader 26 is arranged between an ink fixing position of the fixing unit 25 and the arrangement position of the delivery drum 281 so as to be in this order in the conveyance direction and read the conveyance surface 211a and the surface of the recording media P on the conveyance surface 211a. In this embodiment, the image reader 26 reads the surfaces of the recording media P being conveyed by the conveyor 21 in a predetermined reading range, and outputs imaged data to the controller.

The image reader 26 is used after being calibrated such that pixel values of the imaged data obtained by reading a predetermined standard white plate (reference member) having a uniform and known reflectance are a predetermined value and accordingly uniform. A method for calibrating the image reader 26 is described below.

Figure 3:
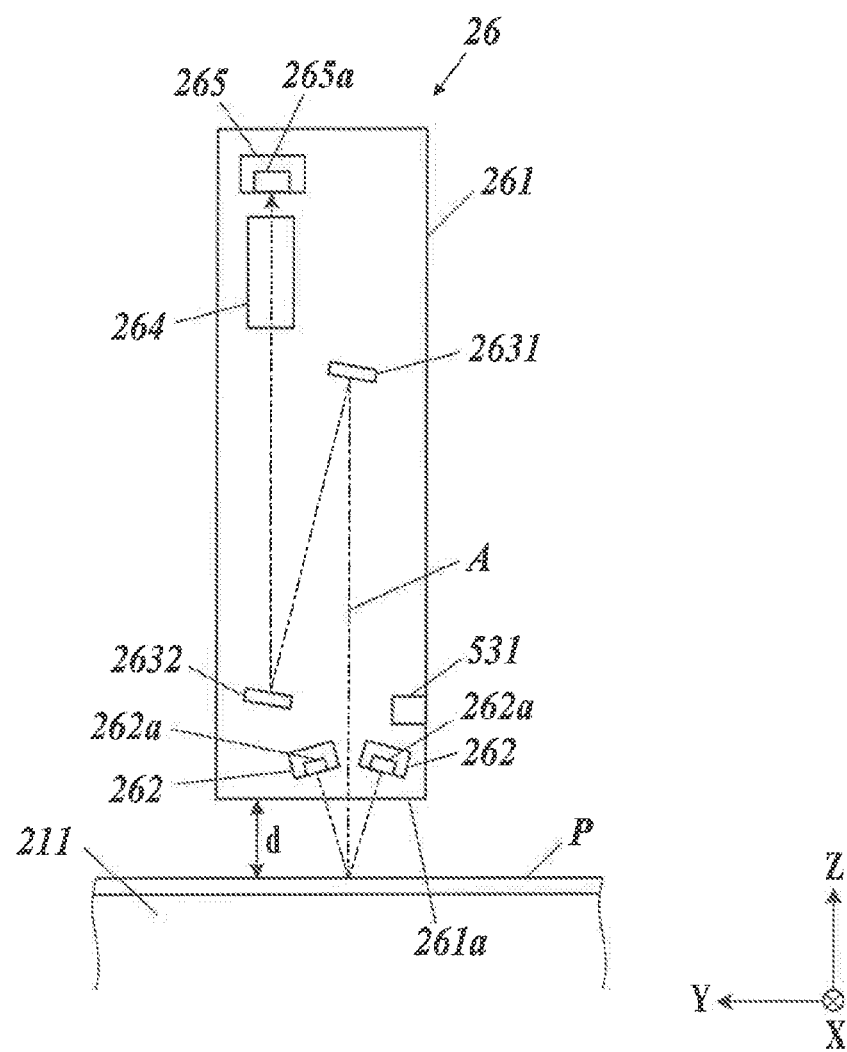
FIG. 3 is a schematic cross-sectional view to explain configuration of an image reader.

FIG. 3 is a schematic cross-sectional view to explain configuration of the image reader 26. FIG. 3 schematically shows the configuration of the image reader 26 on a section perpendicular to the X direction.

The image reader 26 includes: a case 261; and a pair of light sources 262 (illuminators), mirrors 2631, 2632, an optical system 264, and a line sensor 265 which are housed in the case 261.

The case 261 is a cuboid member arranged such that one face faces the conveyance surface 211a. Of the case 261, the face facing the conveyance surface 211a is a light transmission surface 261a constituted of a light transmissive member, such as glass. Hereinafter, the conveyance direction of the recording media P at a position which faces the light transmission surface 261a is referred to as Y direction, and a direction perpendicular to XY plane is referred to as Z direction.

Each of the light sources 262 is a line light source having a plurality of LEDs 262a (Light Emitting Diodes) (light emitters) arranged so as to cover, in the X direction, an image recordable range by the head units 24. The light sources 262, which form a pair, are arranged at positions symmetrical with respect to a predetermined reference plane A perpendicular to the conveyance direction, and emit light to the recording media P on the conveyance surface 211a via the light transmission surface 261a of the case 261. Angles of the light sources 262 are adjusted such that if distance between the light transmission surface 261a and the recording media P on the conveyance surface 211a is a predetermined standard distance d, light is emitted onto a line(s) on the recording media P at the same angle of incidence, the line(s) intersecting the reference plane A.

The mirror 2631 has, in the X direction, a length corresponding to the arrangement area of the light sources 262, and reflects, of the light emitted from the light sources 262 and reflected on the recording media P, the light travelling on the reference plane A in a direction to the mirror 2632. The mirror 2632 is arranged at a position closer to the light transmission surface 261a than the mirror 2631, and reflects the light reflected on the mirror 2631 in a direction to the optical system 264. Arranging the mirrors 2631, 2632 in this way ensures an appropriate optical path length in the case 261.

The optical system 264 condenses the incident light from the mirror 2632 onto positions of imaging elements 265a of a line sensor 265. The optical system 264 is adjusted such that if the distance between the light transmission surface 261a and the recording media P on the conveyance surface 211a is the predetermined standard distance d, images of the surfaces of the recording media P are formed at the positions of the imaging elements 265a of the line sensor 265, namely, such that the surfaces of the recording media P are in focus. As the optical system 264, for example, one in which a large number of graded-index lenses are arranged can be used, the graded-index lenses condensing the incident light at a predetermined position with refractive-index distribution in a direction perpendicular to an optical axis.

The line sensor 265 outputs one-dimensional images by using the imaging elements 265a arranged in the X direction, the imaging elements 265a outputting signals corresponding to intensity of the incident light. More specifically, in the line sensor 265, the imaging elements 265*a* are arranged to be three lines along the X direction, and the imaging elements 265*a* of the respective lines output signals corresponding to the intensities of wavelength components of R (red), G (green) and B (blue) of the incident light, respectively. As the imaging elements 265*a* for R, G and B, for example, a CCD (Charge Coupled Device) sensor or CMOS (Complementary Metal Oxide Semiconductor) sensor having photodiodes as photoelectric conversion elements with color filters arranged on light receiving parts, the color filters transmitting light rays of the wavelength components of R, G and B, respectively, can be used. The image reader 26 may use an area sensor instead of the line sensor 265.

The signals output from the line sensor 265 are subjected to current-voltage conversion, amplification, noise reduction, analog-digital conversion and so forth in a not-shown analog front-end, and output to the controller 40 as imaged data indicating brightness values of the read images. In this embodiment, pixel values of the imaged data indicate intensities of the light detected by the imaging elements 265*a* in 256 gradations from 0 to 255.

In the case 261, near the light sources 262, a temperature sensor 531 which outputs, to the controller 40, detection signals corresponding to temperature is arranged. Herein, "near the light sources 262" indicates an area where temperature changes according to change in temperature of the LEDs 262*a*. Although configuration of the temperature sensor 531 is not particularly limited, the temperature sensor 531 may be configured to detect temperature from current flowing in a thermistor.

The LEDs 262*a* of the light sources 262 have a negative correlation between temperature and brightness of their own. Hence, change in the brightness of the LEDs 262*a* can be obtained from change in the detection result of the temperature near the light sources 262 by a detector 53.

The image reader 26 is attached to a reading position adjuster 27 (reading position adjuster) (FIG. 4). The reading position adjuster 27 adjusts the height position of the image reader 26 such that the distance between the light transmission surface 261*a* and the recording media P is the standard distance d, by moving the image reader 26 in the +Z direction and the −Z direction on the basis of control signals from the CPU 41. Although configuration of the reading position adjuster 27 is not particularly limited, the reading position adjuster 27 may be configured by including: supporting parts which extend in the Z direction; and moving parts to which the case 261 of the image reader 26 is fixed and which can move in the +Z direction and the −Z direction along the supporting parts by rotation of a stepping motor.

The second delivery unit 28 has a belt loop 282 having a ring-shaped belt the inner side of which is supported by two rollers, and the columnar delivery drum 281 which delivers the recording media P from the conveyor 21 to the belt loop 282. The second delivery unit 28 conveys and ejects, with the belt loop 282, the recording media P delivered by the delivery drum 281 from the conveyor 21 onto the belt loop 282 to the sheet receiver 30.

The sheet receiver 30 has a plate-shaped sheet receiving tray 31 where the recording media P ejected from the image recorder 20 by the second delivery unit 28 are placed.

FIG. 4 is a block diagram showing main functional components of the inkjet recording device 1.

The inkjet recording device 1 includes the heater 23, recording head drive units 241 and the recording heads 242, the fixing unit 25, the image reader 26, the reading position adjuster 27, a white plate mover 29 (reference member mover), the controller 40, a conveyance drive unit 51, an operation display unit 52, the detector 53, an input-output interface 54, and a bus 55.

The recording head drive units 241 supply, at appropriate timings, drive signals for deforming the piezoelectric elements according to image data to the recording elements 243 of the recording heads 242, thereby causing the recording heads 242 to discharge, from the nozzles 244, the inks with amounts corresponding to pixel values of the image data.

The white plate mover 29 moves, when the image reader 26 reads a standard white plate, the standard white plate in the Y direction in the state in which the standard white plate faces the light transmission surface 261*a* of the image reader 26. Although configuration of the white plate mover 29 is not particularly limited, the white plate mover 29 may be configured by including: supporting parts which extend in the Y direction; and moving parts to which the standard white plate is fixed and which can move on the supporting parts in the +Y direction and the −Y direction by rotation of a stepping motor. The white plate mover 29 operates on the basis of control signals from the controller 40.

The controller 40 has the CPU 41 (Central Processing Unit) (calibration unit, calibration control unit, recording control unit, defective recording element detection unit), a RAM 42 (Random Access Memory), a ROM 43 (Read Only Memory), and a storage 44.

The CPU 41 reads programs for various types of control and setting data stored in the ROM 43, stores the read ones in the RAM 42, and executes the programs and thereby performs various types of arithmetic processing. The CPU 41 controls the whole operation of the inkjet recording device 1.

The RAM 42 provides the CPU 41 with a memory space for work, and stores temporary data. The RAM 42 may contain a nonvolatile memory.

The ROM 43 stores the programs for various types of control which are executed by the CPU 41, the setting data and so forth. Instead of the ROM 43, a rewritable nonvolatile memory, such as an EEPROM (Electrically Erasable Programmable Read Only Memory) or a flash memory, may be used.

The storage 44 stores print jobs (image recording commands) and image data relevant to the print jobs input from an external device 2 via the input-output interface 54, test image data which are image data on a poor discharge detection chart used for detection of presence or absence of defective nozzles and a head adjustment chart (test image) used for identification of the defective nozzles, which are described below, imaged data by the image reader 26, and so forth. Among these, the print jobs each contain image type information indicating whether or not image data relevant to the print job is the head adjustment chart. The storage 44 also stores image reader calibration data 44*a* relevant to calibration results of the image reader 26. As the storage 44, for example, an HDD (Hard Disk Drive) is used, or a DRAM (Dynamic Random Access Memory) or the like may also be used.

The conveyance drive unit 51 supplies drive signals to the conveyance drum motor for the conveyance drum 211 on the basis of control signals supplied from the CPU 41 so as to rotate the conveyance drum 211 at a predetermined speed and predetermined timings. The conveyance drive unit 51 also supplies, on the basis of control signals supplied from the CPU 41, drive signals to motors which cause the media supply unit 12, the first delivery unit 22 and the second delivery unit 28 to operate so that the recording media P are fed to the conveyor 21 and ejected from the conveyor 21.

The operation display unit 52 includes: a display, such as a liquid crystal display or an organic EL display; and an inputter, such as operation keys or a touchscreen arranged on the screen of the display. The operation display unit 52 displays a variety of pieces of information on the display, and converts input operations of a user(s) on the inputter into operation signals and outputs the operation signals to the controller 40.

The detector 53 includes the temperature sensor 531, and outputs detection results of the temperature near the light sources 262 of the image reader 26 to the controller 40.

The input-output interface 54 mediates data exchange between the external device 2 and the controller 40. The input-output interface 54 is constituted of, for example, one of or a combination of any of a variety of serial interfaces and any of a variety of parallel interfaces.

The bus 55 is a path for the controller 40 and the other components to exchange signals.

The external device 2 is, for example, a personal computer, and supplies the print jobs, the image data and so forth to the controller 40 via the input-output interface 54.

Next, defective nozzle detection operation in the inkjet recording device 1 of this embodiment is described.

The inkjet recording device 1 of this embodiment records, on a recording medium P, the poor discharge detection chart for detection of presence or absence of poor ink discharge, together with an ordinary image relevant to a print job, and detects presence or absence of poor ink discharge, namely, presence or absence of defective nozzles, on the basis of a reading result(s) of the poor discharge detection chart by the image reader 26.

If it is determined from the reading result of the poor discharge detection chart that a defective nozzle(s) is present, a recording medium P is used to record the predetermined head adjustment charge thereon, and the defective nozzle(s) is identified on the basis of a reading result(s) of the head adjustment chart by the image reader 26. If any recording head 242 deviates in position, the deviation (position deviation) can be detected from the reading result. On the basis of these reading results, ink discharge positions and/or ink discharge amounts are adjusted (shading compensation).

FIG. 5 shows examples of an ordinary image 60 and a poor discharge detection chart 61 recorded on a recording medium P. The poor discharge detection chart 61 is recorded on the upstream side of the ordinary image 60 in the conveyance direction, namely, the upstream side in terms of conveyance of the recording medium P, and is constituted of four belt-shaped halftone images recorded with Y, M, C and K inks, respectively. The poor discharge detection chart 61 is recorded, in the width direction, in the image recordable range by the head units 24. If any of the head units 24 has a defective nozzle(s), a color spot(s) E appears in the poor discharge detection chart 61 owing to poor ink discharge from the defective nozzle(s).

The inkjet recording device 1 determines that poor ink discharge is present when reading, with the image reader 26, the poor discharge detection chart 61 and detecting a color spot(s) E in the obtained imaged data.

FIG. 6 each show an example of a head adjustment chart 62 recorded on a recording medium P.

Figure 6A:
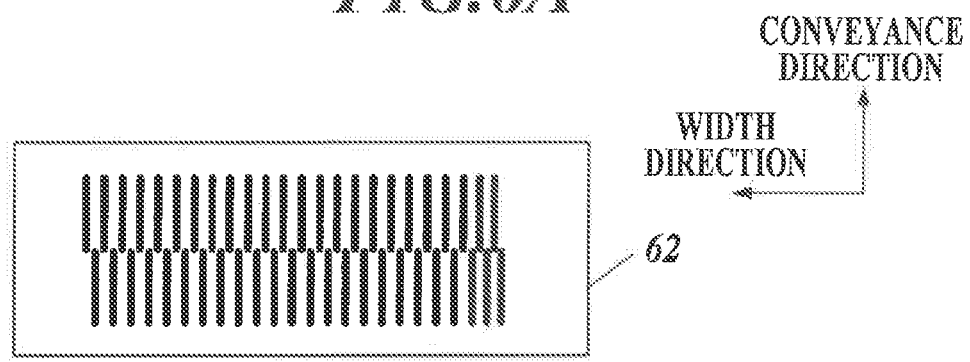
FIG. 6A shows an example of a head adjustment chart recorded on a recording medium.

To detect presence or absence of discharge from the respective nozzles 244 and their discharge positions in the width direction and/or positions of the recording heads 242 in the width direction, for example, as shown in FIG. 6A, the head adjustment chart 62 constituted of line segments extending in the conveyance direction is recorded. The line segments of the head adjustment chart 62 shown in FIG. 6A are recorded with ink which is discharged from the nozzles 244 while the discharge positions are adjusted in the conveyance direction such that ranges of discharge from the nozzles 244 do not overlap one another.

Figure 6B:
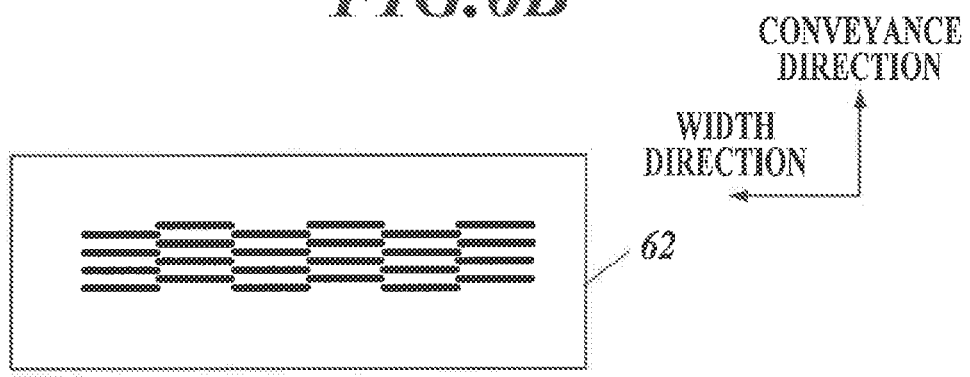
FIG. 6B shows an example of the head adjustment chart recorded on a recording medium.

To detect the discharge positions from the nozzles 244 in the conveyance direction and/or the positions of the recording heads 242 in the conveyance direction, for example, as shown in FIG. 6B, the head adjustment chart 62 constituted of line segments extending in the width direction for lengths corresponding to recording widths of the recording heads 242 is recorded. The line segments of the head adjustment chart shown in FIG. 6B are recorded with ink which is discharged from the nozzles 244 of the same recording head 211 all at once in a short range in the conveyance direction while timings of ink discharge from the nozzles 244 of the respective recording heads 242 are made different from one another as needed.

Figure 6C:
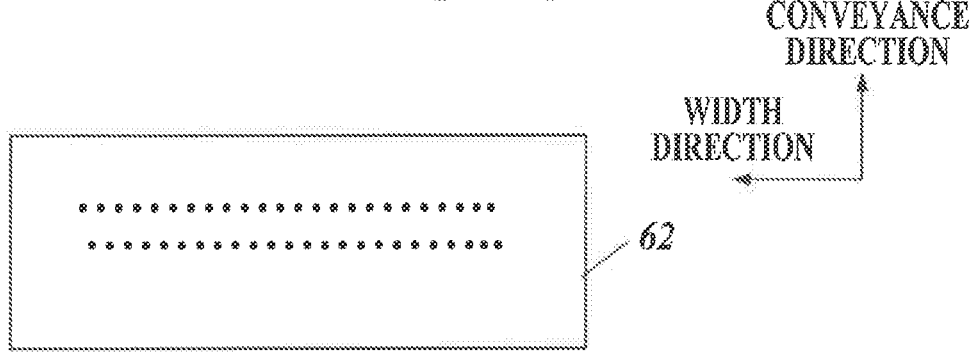
FIG. 6C shows an example of the head adjustment chart recorded on a recording medium.

To detect the ink discharge positions from the nozzles 244 in the width direction and the conveyance direction, for example, as shown in FIG. 6C, the head adjustment chart 62 constituted of dots recorded with the nozzles 244 is recorded.

The head adjustment chart is not limited to those shown in FIG. 6A to FIG. 6C, and for example, may be a shading chart constituted of gradation patterns recorded with the respective nozzles 244. In this case, on the basis of density unevenness in a reading result(s) of the shading chart, the ink discharge positions and/or the ink discharge amounts from the nozzles 244 of the recording heads 242 can be adjusted. Further, the head adjustment chart may be a color management chart having various colors recordable by the inkjet recording device 1, and from hue, saturation and brightness/luminosity in a reading result(s) of the color management chart, defective nozzles may be identified.

Preferably, these head adjustment charts are each formed for each of C, M, Y and K individually.

As described above, the inkjet recording device 1 of this embodiment detects presence or absence of poor ink discharge on the basis of the reading result of the poor discharge detection chart 61 by the image reader 26, and detects defective nozzles and deviation of the positions of the recording heads on the basis of the reading result of the head adjustment chart 62 by the image reader 26 and adjusts the ink discharge positions and the ink discharge amounts on the basis of the detection result. Hence, the inkjet recording device 1 performs, at appropriate timings, calibration operation of calibrating the image reader 26 for values to be detected by the imaging elements 265a so that the image reader 26 can properly read the poor discharge detection chart 61 and the head adjustment chart 62.

Hereinafter, the calibration operation of the image reader 26 is described.

In the calibration operation of the image reader 26 in this embodiment, first, the image reader 26 reads the surface(s) of line-shaped reading ranges (which hereinafter may be simply referred to as "lines") on the standard white plate, thereby generating white plate imaged data constituted of a plurality of line imaged data. The standard white plate is a plate-shaped member having a reading surface larger than the readable range by the line sensor 265. In the calibration operation of the image reader 26, the standard white plate is arranged such that the reading surface faces the light transmission surface 261a. The reading surface of the standard white plate is constituted of, for example, a white member, such as Yupo or PET (polyethylene terephthalate). It is desired that the reading surface be made of material from which foreign matters, such as dust, adhering to the surface, can be easily removed by cleaning the surface.

Figure 7A:
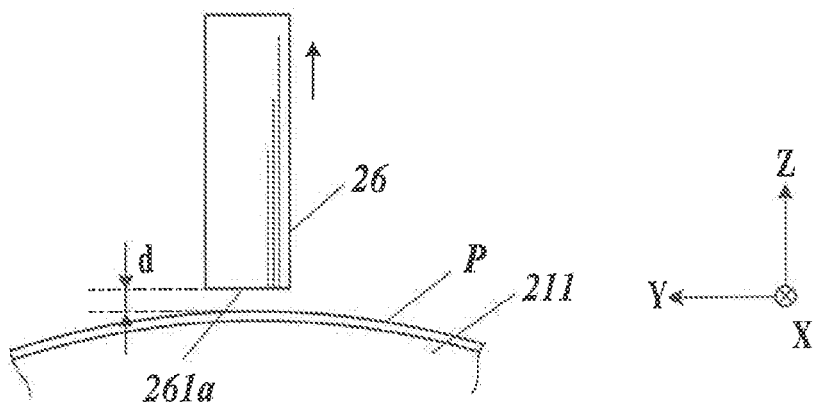
FIG. 7A is a diagram to explain how the image reader reads a standard white plate.
Figure 7B:
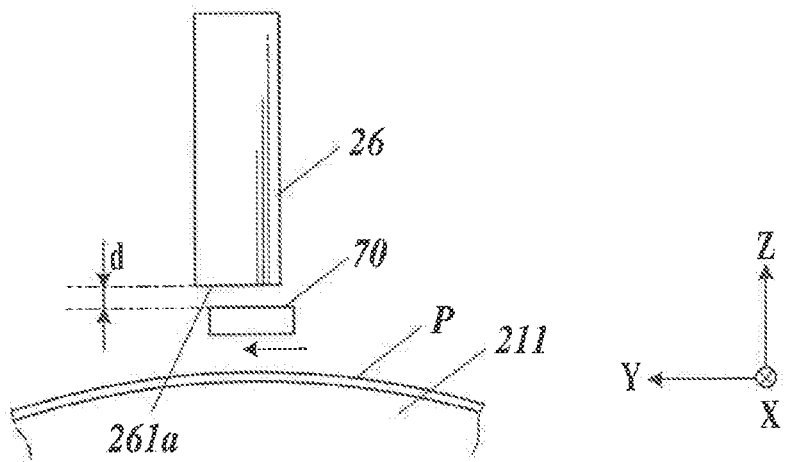
FIG. 7B is a diagram to explain how the image reader reads the standard white plate.

FIG. 7 are diagrams to explain how the image reader 26 reads a standard white plate 70. Of these, FIG. 7A shows a position of the image reader 26 for the image reader 26 to read a recording medium (media) P (which is hereinafter referred to as "recording medium reading position"), and FIG. 7B shows a position of the image reader 26 for the image reader 26 to read the standard white plate 70 (which is hereinafter referred to as "white plate reading position (reference member reading position)). The recording medium reading position shown in FIG. 7A is a position at which the distance between the light transmission surface 261a and the recording medium P in the Z direction is the standard distance d.

When the image reader 26 reads the standard white plate 70, if the image reader 26 is at the recording medium reading position, the reading position adjuster 27 moves the image reader 26 in the +Z direction to the white plate reading position. The white plate reading position is a position to place the standard white plate 70 between the light transmission surface 261a of the image reader 26 and the conveyance drum 211 with a positional relationship with which the distance between the light transmission surface 261a and the standard white plate 70 is the standard distance d. The white plate reading position being, among positions which satisfy the above condition, a position close to the conveyance drum 211 can make a movement distance of the image reader 26 in the calibration operation short.

After the image reader 26 is moved to the white plate reading position, as shown in FIG. 7B, the white plate mover 29 places the standard white plate 70 at a position between the image reader 26 and the conveyance drum 211, the position at which the distance to the light transmission surface 261a in the Z direction is the standard distance d, and moves the standard white plate 70 in the Y direction. Then, the image reader 26 repeatedly reads lines on the surface of the standard white plate 70, the lines extending in a direction intersecting the Y direction (a direction at right angles to the Y direction, i.e. the X direction, in this embodiment), at appropriate timings according to the movement of the standard white plate 70, thereby generating the white plate imaged data.

Although the reading range in the Y direction on the standard white plate 70 and the number of the reading times by the image reader 26 are not particularly limited, in this embodiment, reading is performed 512 times in an area of 2 mm in the Y direction. Hence, the inkjet recording device 1 sets a conveyance speed of the standard white plate 70 by the white plate mover 29 according to the frequency of reading by the image reader 26 so that the image reader 26 can perform the above reading.

When the white plate imaged data is generated, for each imaging element 265a, the average value of pixel values of a plurality of pixels corresponding to the same imaging element 265a is calculated from the white plate imaged data, and consequently, calibration-use image data constituted of the number of pixels which is the same as the number of the imaging elements 265a is generated. It is possible to exclude, from the pixels corresponding to the same imaging element 265a, a pixel(s) having an abnormal pixel value(s) (e.g. a pixel(s) having a pixel value(s) lower/smaller than its surrounding pixels) due to foreign matters, such as dust, and average the pixel values of the remaining pixels. Instead of the average value, another representative value, such as the median value, may be used.

When the calibration-use image data is generated, a correction value for matching each pixel value of the calibration-use image data with a value corresponding to the reflectance of the standard white plate 70 is calculated. More specifically, a correction value C(i) which corrects a pixel value 1(i) of, among the pixels of the calibration-use image data, a pixel corresponding to the $i^{th}$ imaging element 265a in the X direction (where i is a natural number representing an arrangement number of the imaging element 265a) is calculated by the following formula (1) for each of all "i"s.

$$C(i)=1a/1(i) \qquad (1)$$

In the above formula, 1a is a fixed number corresponding to the reflectance of the standard white plate 70 and is a value (240 in this embodiment) lower than 255, which is the maximum value of the pixel values, by a predetermined value. This is to avoid a situation in which a reading target the reflectance of which is higher than the standard white plate 70 is read, and a value obtained by multiplying the pixel value 1(i) by the correction value C(i) is saturated (exceeds 255).

The correction value C(i) is calculated for each of the lines of the imaging elements 265a corresponding to R, G and B of the line sensor 265 and stored in the storage 44 as the image reader calibration data 44a.

When the image reader calibration data 44a is stored in the storage 44, the calibration operation of the image reader 26 is finished.

After the calibration operation of the image reader 26 is performed, if the image reader 26 reads the poor discharge detection chart 61 or the head adjustment chart 62, of imaged data thereon, the pixel value corresponding to the $i^{th}$ imaging element 265a is multiplied by the correction value C(i), and the obtained corrected imaged data (image data) is stored in the storage 44 as the reading result.

Thus, multiplying pixel values of imaged data by the correction value C(i) can correct: sensitivity variation among the imaging elements 265a; and decrease in pixel values at near the ends in the X direction caused by luminous intensity unevenness due to the light sources 262, and accordingly can read the poor discharge detection chart 61 appropriately.

Next, timings for calibration of the image reader 26 are described.

If a reading influence factor which affects reading results by the image reader 26 varies (changes) after the image reader 26 is calibrated, imaged data cannot be appropriately corrected with the correction value C(i), and accordingly image quality of imaged data decreases. A representative reading influence factor is brightness of the LEDs 262a of the light sources 262, and the temperature near the light sources 262 having a negative correlation with the brightness is also an example of the reading influence factor. When the brightness of the LEDs 262a decreases, a range of pixel values of imaged data by the image reader 26 becomes narrow, and brightness resolution decreases.

In order that the image reader 26 properly reads the poor discharge detection chart 61 and the head adjustment chart 62 recorded on recording media P, it is most desirable that the image reader 26 be calibrated before each time the image reader 26 reads a recording medium P. However, if the image reader 26 is calibrated each time the image reader 26 reads a recording medium P, because the image reader 26 can read no recording medium P until processes for/of the calibration are completed, time required for reading increases because of the reading waiting time, in particular, if the image reader 26 intends to read all or many recording media P.

Meanwhile, if the image reader 26 is calibrated, for example, each time the image reader 26 reads a predetermined number of recording media P, there is a case where the image reader 26 cannot be calibrated appropriately because the reading influence factor varies (changes) between the end of the latest calibration and the start of the next calibration. Further, when variation (change) in the reading influence factor is small, and accordingly the calibration is unnecessary, the calibration is performed.

Figure 8:
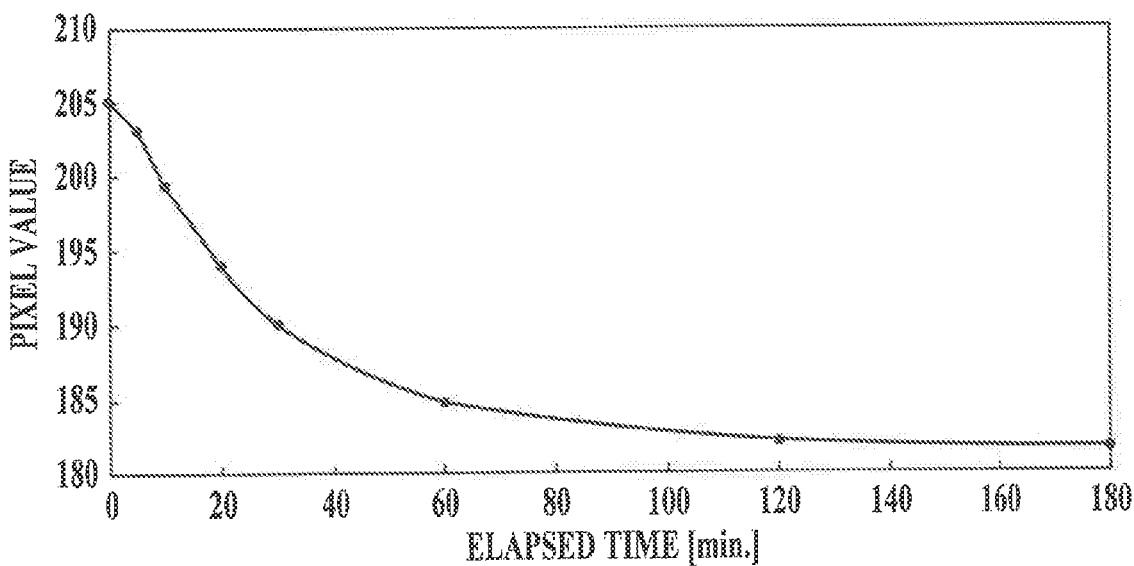
FIG. 8 shows an example of temporal change in brightness of an LED(s).

FIG. 8 shows an example of temporal change in the brightness of the LEDs 262a. This figure shows temporal change in the average value of the pixel values of the imaged data on the standard white plate 70 by the image reader 26. This average value of the pixel values is a value relevant to the brightness of the LEDs 262a (which is hereinafter referred to as "brightness correspondence value), and hence the graph shown in FIG. 8 indicates a pattern/tendency of the temporal change in the brightness of the LEDs 262a. As shown in FIG. 8, the brightness of the LEDs 262a decreases as time elapses after the LEDs 262a are turned on (after start of lighting-up). For 60 minutes from the start of lighting-up, the change rate (decline rate) of the brightness is large. In particular, for 30 minutes from the start of lighting-up, the change rate is quite large. Meanwhile, after 60 minutes from the start of lighting-up, the change rate of the brightness is relatively small. Hence, if the calibration operation is performed each time a predetermined number of recording media P is read, the frequency of calibration may be too low for 30 minutes from the start of lighting-up, whereas the frequency of calibration may be too high after 60 minutes from the start of lighting-up.

Hence, in this embodiment, if the reading influence factor satisfies a predetermined reading influence factor condition, to be specific, if the change amount of the brightness of the LEDs 262a from the time of the start of light emission by the light sources 262 or the time of the latest calibration, whichever is later (which is hereinafter referred to as "reference time"), is equal to or more than a predetermined value Bth, the image reader 26 is calibrated. More specifically, in this embodiment, the temperature sensor 531 detects nearby temperature T, which is the temperature near the light sources 262 and corresponds to the brightness of the LEDs 262a, and if change in the nearby temperature T from the reference time satisfies a predetermined temperature change condition, namely, if the change amount of the nearby temperature T from the reference time is equal to or more than a predetermined value Tth, the image reader 26 is calibrated. The predetermined value Tth corresponds to the change amount of the nearby temperature T when the brightness of the LEDs 262a changes by the predetermined value Bth.

Hence, immediately after the light sources 262 are turned on, the image reader 26 is calibrated with high frequency, and as the time elapses, the frequency of calibration decreases. Consequently, the image reader 26 is calibrated with frequency which is neither too high nor too low, according to the change in the brightness of the LEDs 262a of the light sources 262.

Further, of the poor discharge detection chart 61 and the head adjustment chart 62, for reading the poor discharge detection chart 61, the image reader 26 is not always needed to be calibrated with high accuracy because as far as presence or absence of the color spot(s) E shown in FIG. 5 can be detected from the reading result, it is enough. Meanwhile, for reading the head adjustment chart 62, the image reader 26 is needed to be calibrated with high accuracy because accurate positions and densities of lines, dots, gradation patterns and so forth included in the head adjustment chart 62 need to be detected.

Hence, in this embodiment, if an image to be recorded by the head units 24 satisfies a predetermined image type condition, to be specific, if an image to be read by the head units 24 is the head adjustment chart 62, the image reader 26 is calibrated regardless of the nearby temperature T detected by the detector 53.

Next, a control procedure by the CPU 41 in an image recording process which is relevant to image recording operation and includes the defective nozzle detection operation and the calibration operation of the image reader 26 is described.

Figure 9:
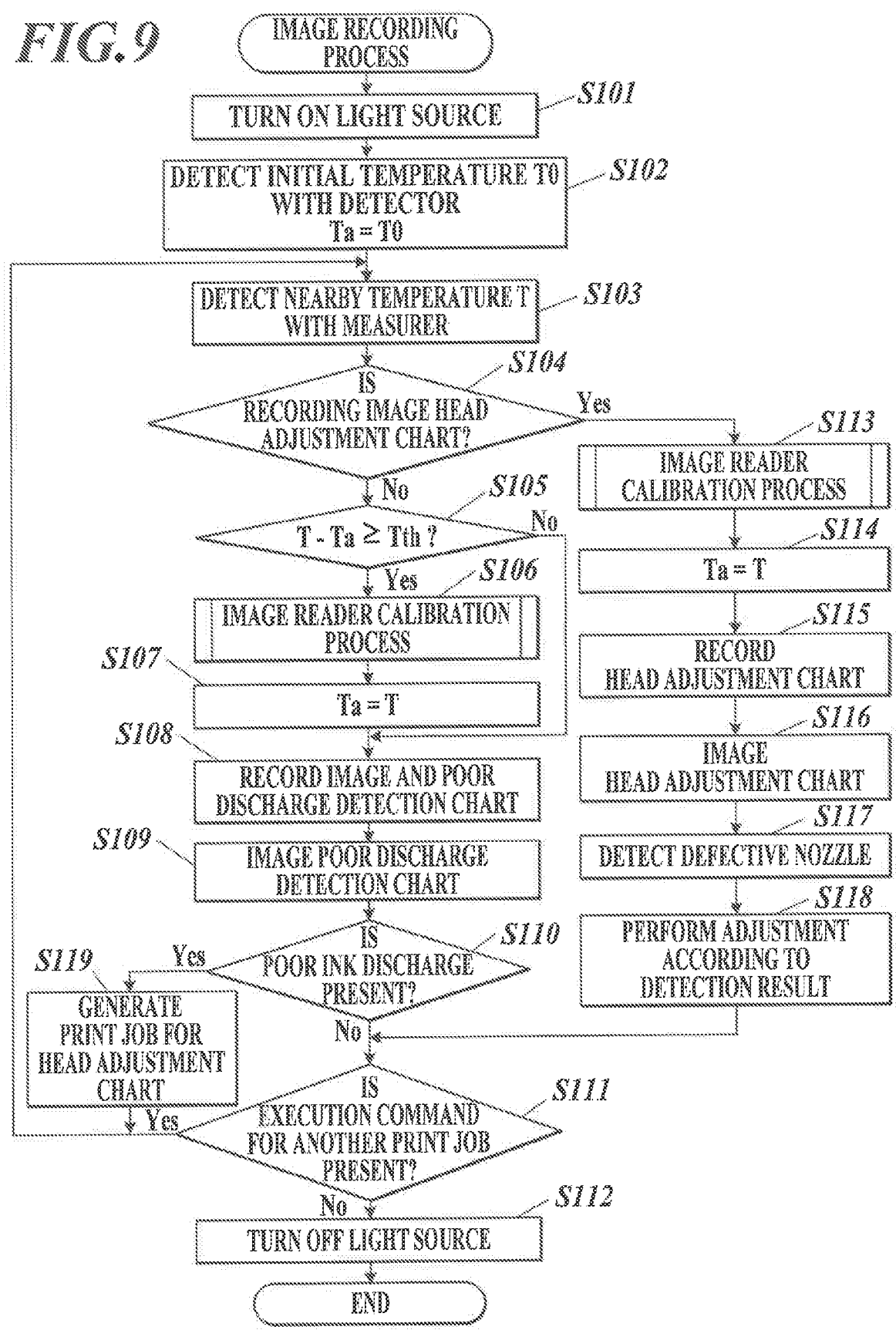
FIG. 9 is a flowchart showing a control procedure in an image recording process.

FIG. 9 is a flowchart showing the control procedure by the CPU 41 in the image recording process.

This image recording process is performed when a print job and image data are input to the controller 40 from the external device 2 via the input-output interface 54, and/or performed at predetermined timings, such as the time of manufacturing or shipping of the inkjet recording device 1 and the time of replacement of the head unit 24 or the recording head 242, and/or when a user performs a predetermined input operation on the operation display unit 52 to input an instruction to perform detection of defective nozzles.

Before start of the image recording process, the CPU 41 causes the conveyance drive unit 51 to output a drive signal to the conveyance drum motor for the conveyance drum 211 to cause the conveyance drum 211 to start rotating.

When the image recording process is started, the CPU 41 outputs a control signal to the image reader 26 to turn on the light sources 262 (Step S101).

The CPU 41 outputs a control signal to the detector 53 to cause the detector 53 to output a detection result of the nearby temperature (herein, initial temperature T0) by the temperature sensor 531, and assigns T0 to a variable Ta relevant to the temperature (Step S102).

The CPU 41 outputs a control signal to the detector 53 to cause the detector 53 to output a detection result of the nearby temperature T by the temperature sensor 531, and obtains the same (Step S103).

The CPU 41 refers to image type information included in the print job to determine whether or not an image instructed by the print job to record (i.e. a recording image) is the head adjustment chart 62 (Step S104).

When determining that the image to record is an image other than the head adjustment chart 62 (Step S104: No), the CPU 41 determines whether or not difference between the nearby temperature T detected in Step S103 and the temperature Ta is equal to or more than the predetermined value Tth (Step S105). When determining that the difference between the nearby temperature T and the temperature Ta is equal to or more than the predetermined value Tth (Step S105: Yes), the CPU 41 performs the image reader calibration process described below (Step S106). If this is the first time that Step S105 is performed since the start of the image recording process, the image recording process in Step S106 is performed regardless of the determination result in Step S105. When finishing the image reader calibration process, the CPU 41 assigns T to the variable Ta (Step S107).

When determining that the difference between the nearby temperature T and the temperature Ta is less than the predetermined value Tth (Step S105: No) or when finishing Step S107, the CPU 41 causes the head units 24 to record the ordinary image 60 and the poor discharge detection chart 61 on a recording medium P (Step S108). More specifically, the CPU 41 makes image data on the print job and test image data on the poor discharge detection chart 61 stored in the storage 44 be supplied from the recording head drive units 241 to the recording heads 242 at appropriate timing(s) according to the rotation of the conveyance drum 211, thereby causing the head units 24 to discharge the inks onto the recording medium P so as to record the ordinary image 60 and the poor discharge detection chart 61 on the recording medium P. Further, the CPU 41 causes the fixing unit 25 to emit predetermined energy rays to the inks, thereby fixing the inks to the recording medium P, at the timing when the recording medium P having the inks reaches the position of the fixing unit 25.

The CPU 41 causes the image reader 26 to image the poor discharge detection chart 61 on the recording medium P (Step S109). More specifically, the CPU 41 causes the image reader 26 to repeatedly read the poor discharge detection chart 61 on the recording medium P at appropriate timings according to the rotation of the conveyance drum 211, thereby obtaining imaged data, and stores the imaged data in the storage 44. Then, the CPU 41 refers to the image reader calibration data 44a stored in the storage 44 by the image reader calibration process in Step S106, and multiplies, of the imaged data on the poor discharge detection chart 61, the pixel value of the pixel corresponding to the $i^{th}$ imaging element 265a by the correction value C(i), and stores the obtained corrected imaged data (image data) in the storage 44.

The CPU 41 determines whether or not a color spot(s) E, which indicates poor ink discharge, is present in the poor discharge detection chart 61 on the basis of the imaged data on the poor discharge detection chart 61 (Step S110).

When determining that no poor ink discharge is present (Step S110: No), the CPU 41 determines whether or not an execution command for another print job is present (has been obtained) (Step S111). When determining that an execution command for another print job has been obtained (Step S111: Yes), the CPU 41 proceeds to Step S103.

When determining that an execution command for another print job is not present (Step S111: No), the CPU 41 outputs a control signal to the image reader 26 to turn off the light sources 262 (Step S112). When finishing Step S112, the CPU 41 ends the image recording process.

In Step S110, when determining that poor ink discharge is present (S110: Yes), the CPU 41 generates a print job for the head adjustment chart 62 as an instruction to record, and stores the same in the storage 44 (Step S119), and proceeds to Step S103.

In Step S104, when determining that the image to record is the head adjustment chart 62 (Step S104: Yes), the CPU 41 performs the image reader calibration process described below (Step S113), and assigns T to the variable Ta (Step S114).

The CPU 41 causes the head units 24 to record the head adjustment chart 62 on a recording medium P (Step S115). More specifically, the CPU 41 makes test image data on the head adjustment chart 62 stored in the storage 44 be supplied from the recording head drive units 241 to the recording heads 242 at appropriate timing(s) according to the rotation of the conveyance drum 211, thereby causing the head units 24 to discharge the inks onto the recording medium P so as to record the head adjustment chart 62 on the recording medium P. Further, the CPU 41 causes the fixing unit 25 to emit the predetermined energy rays to the inks, thereby fixing the inks to the recording medium P, at the timing when the recording medium P having the inks reaches the position of the fixing unit 25.

The CPU 41 causes the image reader 26 to image the head adjustment chart 62 on the recording medium P (Step S116). More specifically, the CPU 41 causes the image reader 26 to repeatedly read the head adjustment chart 62 on the recording medium P at appropriate timings according to the rotation of the conveyance drum 211, thereby obtaining imaged data, and stores the imaged data in the storage 44. Then, the CPU 41 refers to the image reader calibration data 44a stored in the storage 44 by the image reader calibration process in Step S113, and multiplies, of the imaged data on the head adjustment chart 62, the pixel value of the pixel corresponding to the $i^{th}$ imaging element 265a by the correction value C(i), and stores the obtained corrected imaged data (image data) in the storage 44.

The CPU 41 detects defective nozzles on the basis of the corrected imaged data on the head adjustment chart 62 (Step S117). More specifically, the CPU 41 reads, from the imaged data on the head adjustment chart 62, positions and densities of line segments or dots recorded with the nozzles 244, and searches the positions and the densities for those having values outside normal values, thereby detecting defective nozzles. Further, the CPU 41 detects deviation of the positions of the recording heads 242 from the imaged data on the head adjustment chart 62.

The CPU 41 performs adjustment thereof according to the detection result obtained in Step S117 (Step S118). More specifically, the CPU 41 changes settings such that the ink(s) is not discharged from a defective nozzle(s), and the ink discharge amounts from its/their surrounding nozzles 244 increase according to the ink amount(s) not discharged from the defective nozzle(s). Further, if deviation of the recording head(s) 242 is present, the CPU 41 changes settings of the nozzles 244 which discharge the ink(s) and/or settings of their ink discharge timings, thereby adjusting the ink discharge positions. If such adjustment hardly records images having a desired image quality, the controller 40 causes a not-shown cleaning unit to clean an ink discharge surface(s) of the head unit(s) 24, and/or causes the head units 24 to stop the image recording operation and the operation display unit 52 to perform predetermined notification. When finishing Step S118, the CPU 41 proceeds to Step S111.

Figure 10:
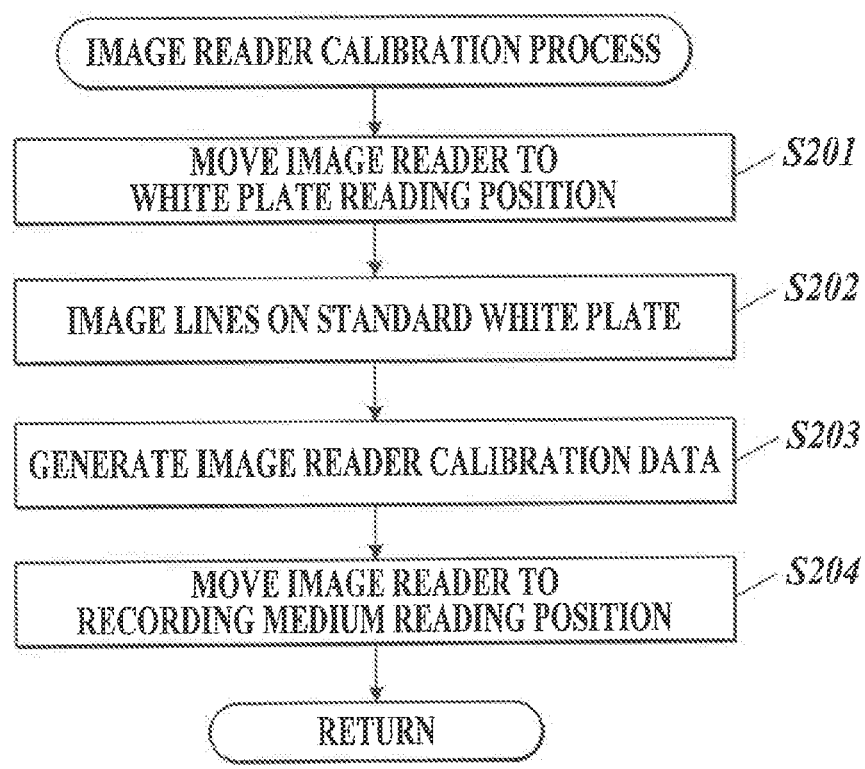
FIG. 10 is a flowchart showing a control procedure in an image reader calibration process.

FIG. 10 is a flowchart showing a control process by the CPU 41 in the image reader calibration process.

When starting the image reader calibration process, the CPU 41 outputs a control signal to the reading position adjuster 27 to cause the reading position adjuster 27 to move the image reader 26 to the white plate reading position shown in FIG. 7B (Step S201).

The CPU 41 causes the image reader 26 to image a plurality of lines on the standard white plate 70 (Step S202). More specifically, the CPU 41 outputs a control signal to the white plate mover 29 to cause the white plate mover 29 to place the standard white plate 70 at the position, shown in FIG. 7B, where the standard white plate 70 faces the light transmission surface 261a, and move the standard white plate 70 in the Y direction at a predetermined speed. Further, the CPU 41 causes the image reader 26 to repeatedly read the standard white plate 70 at appropriate intervals, thereby obtaining white plate imaged data, and stores the same in the storage 44. Further, CPU 41 averages pixel values of pixels corresponding to each same image element 265a in the white plate imaged data, and generates and stores the calibration-use image data in the storage 44.

The CPU 41 generates the image reader calibration data 44a on the basis of the calibration-use image data, and stores the same in the storage 44 (Step S203: calibration step). More specifically, the CPU 41 calculates the correction value C(i) from the calibration-use image data on the basis of the above algorithm, and stores the same as the image reader calibration data 44a in the storage 44.

The CPU 41 outputs a control signal to the reading position adjuster 27 to cause the reading position adjuster 27 to move the image reader 26 to the recording medium reading position shown in FIG. 7A (Step S204), and ends the image reader calibration process.

As described above, the inkjet recording device 1 according to this embodiment includes: the head units 24 which record an image(s) on a recording medium (media) P; the image reader 26 which reads, with the imaging elements 265a, the surface of the recording medium P and the surface of the predetermined standard white plate 70; and the CPU 41, wherein the CPU 41 (as the calibration unit) calibrates the image reader 26 for values to be detected by the imaging elements 265a, on the basis of the reading result of the surface of the standard white plate 70 by the image reader 26, and (as the calibration control unit) performs the calibration in at least one of: the case where the type of the image to be recorded on the recording medium P by the head units 24 satisfies the predetermined image type condition; and the case where the predetermined reading influence factor which affects the reading result of the surface of the recording medium P by the image reader 26 satisfies the predetermined reading influence factor condition. According to this configuration, the image reader 26 can be calibrated at appropriate timings according to the change in the reading influence factor. Further, if the type of an image to be recorded on a recording medium P satisfies the predetermined condition, the image reader 26 can be calibrated regardless of the reading influence factor. Consequently, the image reader 26 can be calibrated at appropriate timings at which the calibration is need.

Further, with the recording elements 243 included in the head units 24 performing the recording operation, the head units 24 record the image on the recording medium P, and the CPU 41 (as the recording control unit) causes the head units 24 to record the head adjustment chart 62 on a recording medium P, the head adjustment chart 62 being used for detecting defective nozzles (and defective recording elements) which poorly performs the recording operation, and (as the calibration control unit) performs the calibration if the image to be recorded by the head units 24 is the head adjustment chart 62. Hence, the image reader 26 is calibrated before reading the head adjustment chart 62, and accordingly density distribution of the head adjustment chart 62 can be read with high accuracy. This can detect defective nozzles appropriately. Further, if an image not used for identification of defective nozzles is read, it can be determined that the calibration is not performed according to the type of the image. This can suppress decrease in reading efficiency due to increase in length of a period during which the image reader 26 cannot read recorded images because of the calibration.

Further, the CPU 41 (as the defective recording element detection unit) detects defective recording elements from the recording elements 243 on the basis of the reading result of the head adjustment chart 62 by the image reader 26. This can detect and identify defective recording elements in the inkjet recording device 1.

Further, the inkjet recording device 1 includes the detector 53 which detects the nearby temperature T as the reading influence factor, wherein the CPU 41 (as the calibration control unit) performs the calibration if the detection result by the detector 53 satisfies the predetermined condition. This can detect the reading influence factor, and determine timings of the calibration in the inkjet recording device 1.

Further, the inkjet recording device 1 includes the light sources 262 which emit light of the LEDs 262a to the surface of the recording medium P to be read by the image reader 26, wherein the brightness of the LEDs 262a changes according to the temperature of the LEDs 262a, the reading influence factor includes the nearby temperature T near the light sources 262, and the CPU 41 (as the calibration control unit) performs the calibration if change in the nearby temperature T from the predetermined reference time satisfies the predetermined temperature change condition. Hence, if the change amount of the brightness of the LEDs 262a according to the change in the temperature of the LEDs 262a reaches a value corresponding to the change in the nearby temperature T, the change satisfying the temperature change condition, the image reader 26 is calibrated. Consequently, the image reader 26 can be calibrated at appropriate timings according to the change in the brightness of the LEDs 262a.

Further, the reference time is the time of the start of the light emission by the light sources 262 or the time of the latest calibration by the calibration unit, whichever is later. This can calibrate the image reader 26 before the image reader 26 starts obtaining inappropriate reading results because of the change in the reading influence factor during a period during which the calibration is not conventionally performed.

Further, the light sources 262 use, as light emitters, the LEDs 262a. This can reduce power consumption of the light sources 262.

Further, a method for controlling the inkjet recording device 1 according to this embodiment includes a calibration step of calibrating the image reader 26 on the basis of the reading result of the surface of the standard white plate 70 by the image reader 26, wherein the calibration step is performed in at least one of: the case where the type of an image to be recorded on a recording medium P by the head units 24 satisfies the predetermined image type condition; and the case where the predetermined reading influence factor which affects the reading result of the surface of the recording medium P by the image reader 26 satisfies the predetermined reading influence factor condition. According to this method, the image reader 26 can be calibrated at appropriate timings at which the calibration is needed.

One embodiment of the present invention has an effect of calibrating a reader(s) at more appropriate timings.

First Modification

Next, a first modification of the above embodiment is described. This modification is different from the embodiment in that the image reader 26 is calibrated at predetermined timings according to the elapsed time since the start of the light emission by the light sources 262. Hereinafter, different points from the embodiment are described.

Temporal change in the brightness of the LEDs 262a is characteristic to the LEDs 262a. Hence, the brightness of the LEDs 262a can be obtained from elapsed time t since the start of the light emission by the light sources 262. That is, the elapsed time t is an example of the reading influence factor.

In this modification, the controller 40 measures the elapsed time t since the start of the latest light emission by the light sources 262, and if the elapsed time t satisfies a predetermined elapsed time condition, namely, if any of predetermined reference timings has passed by the elapsed time t, the image reader 26 is calibrated. The reference timings are determined such that the brightness change of the LEDs 262a between two consecutive reference timings matches the predetermined value Bth. Hence, at the timing when the change amount of the brightness of the LEDs 262a from the reference time reaches (or exceeds) the predetermined value Bth, the image reader 26 is calibrated.

In this modification too, if it is determined that an image to be recorded by the head units 24 is the head adjustment chart 26, the image reader 26 is calibrated regardless of the elapsed time t.

Figure 11:
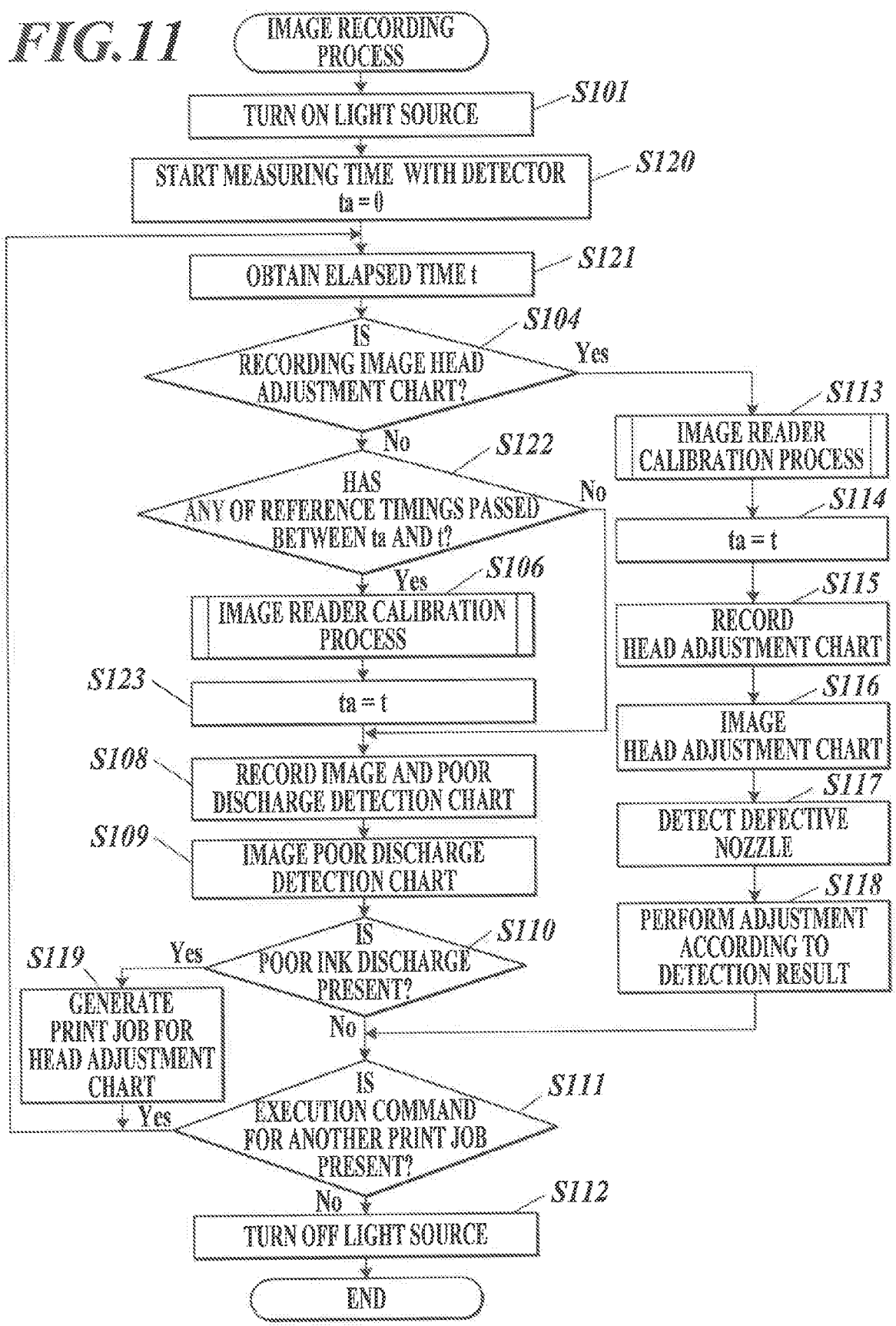
FIG. 11 is a flowchart showing a control procedure in an image recording process according to a first modification.

FIG. 11 is a flowchart showing a control procedure by the CPU 41 in an image recording process according to this modification. This flowchart is one in which Steps S102, S103, S105, S107 and S114 in the flowchart of the image recording process according to the embodiment shown in FIG. 9 are removed, and Steps S120 to S124 are added. Hereinafter, different points from the flowchart shown in FIG. 9 are described.

When finishing Step S101, the CPU 41 starts measuring the elapsed time t, and assigns 0 to a variable ta relevant to the elapsed time (Step S120). Further, the CPU 41 obtains the elapsed time t (Step S121).

In Step S104, when determining that the image to record is an image other than the head adjustment chart 62 (Step S104: No), the CPU 41 determines whether or not, between ta and t, any of the reference timings has passed (Step S122). When determining that any of the reference timings has passed (Step S122: Yes), the CPU 41 performs the image reader calibration process (Step S106), and assigns t to the variable ta (Step S123). If this is the first time that Step S122 is performed since the start of the image recording process, the image recording process in Step S106 is performed regardless of the determination result in Step S122. When determining that none of the reference timings has passed (Step S122: No), the CPU 41 proceeds to Step S108.

In Step S104, when determining that the image to record is the head adjustment chart 62 (Step S104: Yes), the CPU 41 performs the image reader calibration process (Step S113), and assigns t to the variable ta (Step S124).

As described above, the inkjet recording device 1 according to this modification includes the light sources 262 which emit, to the surface of the recording medium P to be read by the image reader 26, light of the light emitters, the brightness of which changes with time, wherein the reading influence factor includes the elapsed time t since the start of the latest light emission by the light sources 262. Hence, if the brightness of the LEDs 262a changes by an amount corresponding to time elapsed which satisfies the elapsed time condition as the reading influence factor condition, the image reader 26 is calibrated. Consequently, the image reader 26 can be calibrated at appropriate timings according to the change in the brightness of the LEDs 262a.

Second Modification

Next, a second modification of the above embodiment is described. This modification is different from the embodiment in that the brightness of the LEDs 262 is directly detected, and the image reader 26 is calibrated according to the detection result of the brightness. Hereinafter, different points from the embodiment are described.

In this modification, the detector 53 includes a light detector which detects and outputs the brightness of the LEDs 262a to the controller 40. The brightness of the LEDs 262a detected by the light detector is an example of the brightness correspondence value. In this modification, if change in the brightness from the reference time detected by the detector 53 satisfies a predetermined brightness correspondence value change condition, namely, if it is determined that the change amount of the detected brightness from the reference time is equal to or more than the predetermined value Bth, the image reader 26 is calibrated.

The light detector of the detector 53 is arranged, for example, at a position in the case 261 of the image reader 26, the position being irradiated with the light emitted from the LEDs 262a, and includes a photoelectric conversion element(s) which outputs a signal(s) corresponding to the intensity of the incident light.

Figure 12:
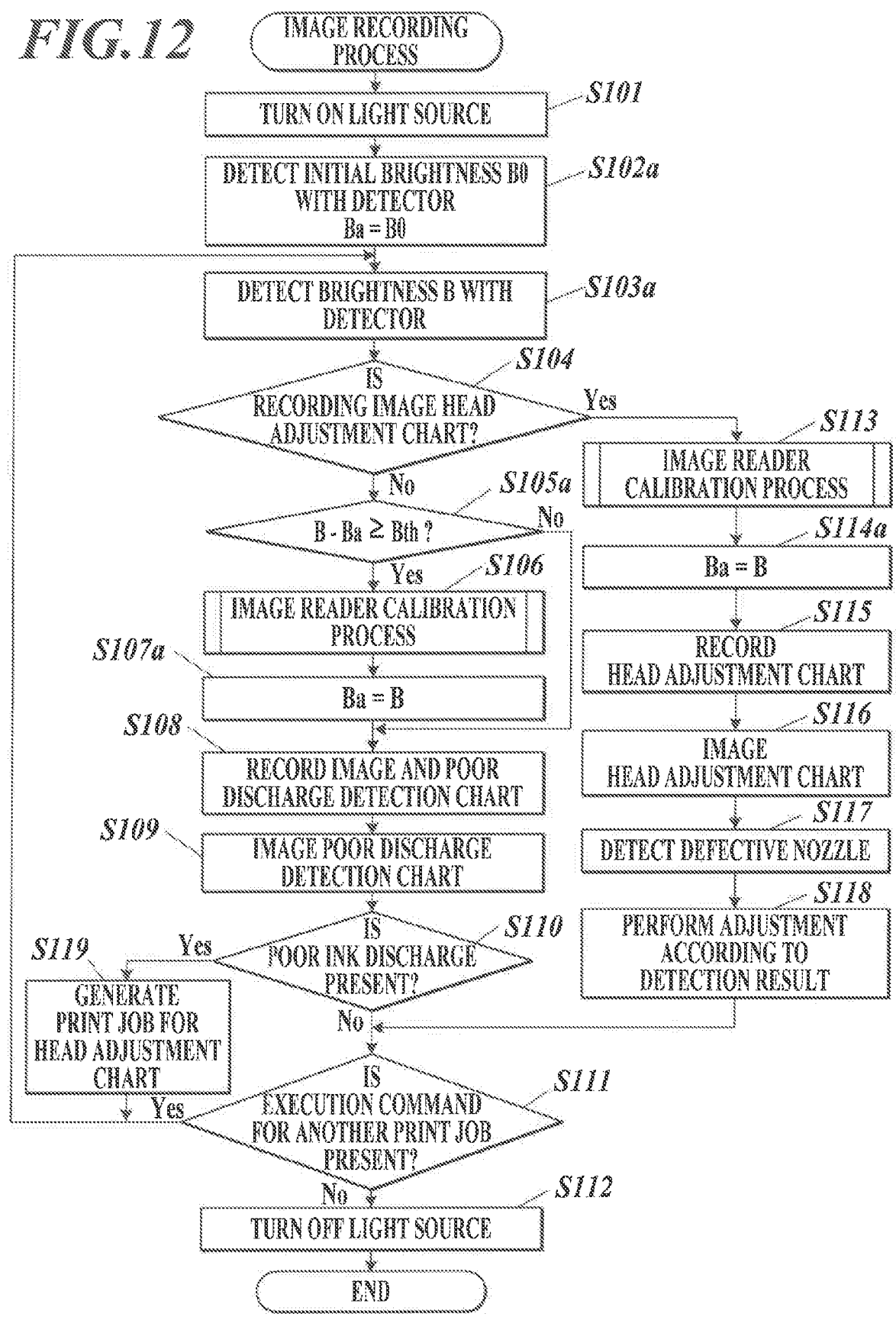
FIG. 12 is a flowchart showing a control procedure in an image recording process according to a second modification.

FIG. 12 is a flowchart showing a control procedure by the CPU 41 in an image recording process according to this modification. This flowchart is one in which Steps S102, S103, S105, S107 and S114 in the flowchart of the image recording process according to the embodiment shown in FIG. 9 are replaced by Steps S102a, S103a, S105a, S107a and S114a, respectively. Hereinafter, different points from the flowchart shown in FIG. 9 are described.

In Step S102a, the CPU 41 outputs a control signal to the detector 53 to cause the detector 53 to output a detection result of the brightness (herein, initial brightness B0) of the LEDs 262a by the light detector, and assigns B0 to a variable Ba relevant to the brightness.

In Step S103a, the CPU 41 outputs a control signal to the detector 53 to cause the detector 53 to output a detection result of brightness B by the light detector, and obtains the same.

In Step S105a, the CPU 41 determines whether or not difference between the brightness B detected in Step S103a and the brightness Ba is equal to or more than the predetermined value Bth. When determining that the difference between the brightness B and the brightness Ba is equal to or more than the predetermined value Bth (Step S105a: Yes), the CPU 41 performs the image reader calibration process (Step S106), and assigns B to the variable Ba (Step S107a). When determining that the difference is less than the predetermined value Bth (Step S105a: No), the CPU 41 proceeds to Step S108.

Further, in Step S114a, the CPU 41 assigns B to the variable Ba.

As described above, the inkjet recording device 1 according this modification includes the light sources 262 which emit light of the LEDs 262a to the surface of the recording medium P to be read by the image reader 26, wherein the reading influence factor includes the brightness correspondence value relevant to the brightness of the LEDs 262a, and the CPU 41 (as the calibration control unit) performs the calibration if change in the brightness correspondence value from the predetermined reference time satisfies the predetermined brightness correspondence value change condition. Hence, if the change amount of the brightness of the LEDs 262a reaches a value which meets the brightness correspondence value change condition, the image reader 26 is calibrated. Consequently, the image reader 26 can be calibrated at appropriate timings according to the change in the brightness of the LEDs 262a.

Third Modification

Next, a third modification of the above embodiment is described. This modification is different from the embodiment in that the image reader 26 is calibrated at timings based on reading results obtained by the image reader 26 reading a predetermined reading target region provided on the conveyance surface 211a (placement surface) of the conveyance drum 211 (reading target member). Hereinafter, different points from the embodiment are described.

Figure 13:
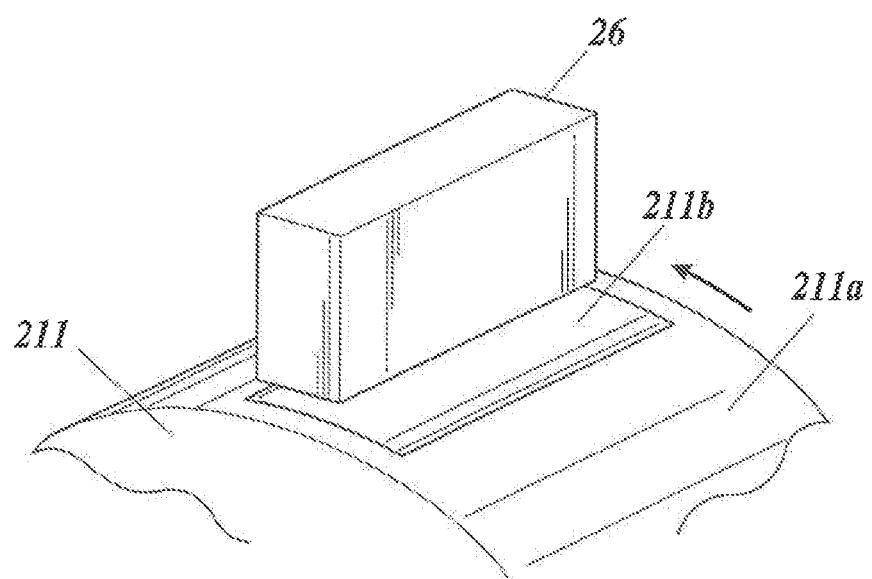
FIG. 13 is a schematic diagram to explain how the image reader reads a reading target region according to a third modification.

FIG. 13 is a schematic diagram to explain how the image reader 26 reads the reading target region according to this modification. FIG. 13 shows a part of the conveyance surface 211*a* of the conveyance drum 211 and the image reader 26.

The conveyance drum 211 of this embodiment has a reading target region 211*b* made of white material having a uniform reflectance provided, on the conveyance surface 211*a*, outside the area(s) where recording media P can be placed. The reading target region 211*b* is arranged so as to cover, in a direction along the rotational shaft of the conveyance drum 211, the reading range by the image reader 26. The width of the reading target region 211*b* in the circumferential direction of the outer circumferential surface of the conveyance drum 211 is a width in which the image reader 26 can read the reading target region 211*b* a predetermined number of times (e.g. 512 times) while the conveyance drum 211 is rotating. The reading target region 211*b* may be formed by painting the conveyance surface 211*a* white, or may be formed by fitting a plate-shaped member made of white material, such as barium sulfate, into the conveyance surface 211*a*. The reading target region 211*b* being white means that it has an ISO brightness (degree of white) of 80 or more.

A predetermined representative value V (the average value, the medium value, etc.) relevant to pixel values of imaged data obtained by the image reader 26 reading the reading target region 211*b* is approximately proportional to the brightness of the LEDs 262*a*. That is, the representative value V is an example of the brightness correspondence value. In this modification, the image reader 26 reads the reading target region 211*b* periodically, and if the change amount of the representative value V of the obtained imaged data from the reference time is equal to or more than a predetermined value Vth, the image reader 26 is calibrated. The predetermined value Vth corresponds to the change amount of the representative value V when the brightness of the LEDs 262*a* changes by the predetermined value Bth. Hence, at the timing when the change amount of the brightness of the LEDs 262*a* from the reference time reaches (or exceeds) the predetermined value Bth, the image reader 26 is calibrated.

A flowchart of an image recording process according to this modification corresponds to the flowchart of the image recording process according to the second modification shown in FIG. 12 with the initial brightness B0, the brightness B, the predetermined value Bth and the variable Ba replaced by an initial representative value V0, the representative value V, the predetermined value Vth and a variable Va, respectively. The other points are the same as those in the image recording process according to the second modification, and hence explanations thereof are omitted here.

As described above, the inkjet recording device 1 according to this modification includes the conveyor 21 which conveys a recording medium (media) P, wherein the image reader 26 reads the surface of the recording medium P being conveyed by the conveyor 21 and the reading target region 211*b* included in the conveyor 21, the light sources 262 emit the light to the recording medium P and the reading target region 211*b* being conveyed by the conveyor 21, and the brightness correspondence value includes the predetermined representative value V relevant to pixel values of imaged data obtained by the image reader 26 reading the reading target region 211*b*. Hence, the image reader 26 can be calibrated at appropriate timings by obtaining the representative value V as the reading influence factor on the basis of the reading result of the reading target region 211*b* by the image reader 26. Further, according to this configuration, other than the conveyance drum 211 and the image reader 26, no additional component is needed to detect the reading influence factor, and accordingly downsizing and cost reduction of the inkjet recording device 1 can be realized.

Further, the conveyor 21 conveys the recording medium P by moving the conveyance drum 211 with the recording medium P placed on the conveyance surface 211*a* of the conveyance drum 211. According to this configuration, other than the conveyance drum 211, which is used for conveying recording media P, no separate reading target member is needed to be provided, and accordingly configuration of the inkjet recording device 1 can be simplified.

Fourth Modification

Next, a fourth modification of the above embodiment is described. This modification is different from the embodiment in that the image reader 26 is calibrated at timings based on reading results obtained by the image reader 26 reading, on a solid white recording medium P being conveyed by the conveyance drum 211, a no-image-recorded region where no image is recorded. Hereinafter, different points from the embodiment are described. The recording medium P being white means that it has an ISO brightness of 80 or more.

A predetermined representative value W (the average value, the medium value, etc.) relevant to pixel values of imaged data obtained by the image reader 26 reading the no-image-recorded region on the recording medium P is approximately proportional to the brightness of the LEDs 262*a*. That is, the representative value W is an example of the brightness correspondence value. In this modification, the image reader 26 reads the no-image-recorded region on the recording medium P periodically, and if the change amount of the representative value W of the obtained imaged data from the reference time is equal to or more than a predetermined value Wth, the image reader 26 is calibrated. The predetermined value Wth corresponds to the change amount of the representative value W when the brightness of the LEDs 262*a* changes by the predetermined value Bth. Hence, at the timing when the change amount of the brightness of the LEDs 262*a* from the reference time reaches (or exceeds) the predetermined value Bth, the image reader 26 is calibrated.

A flowchart of an image recording process according to this modification corresponds to the flowchart of the image recording process according to the third modification described above with the initial brightness V0, the representative value V, the predetermined value Vth and the variable Va replaced by an initial representative value W0, the representative value W, the predetermined value Wth and a variable Wa, respectively. The other points are the same as those in the image recording process according to the third modification, and hence explanations thereof are omitted here.

As described above, according to this modification, the brightness correspondence value includes the predetermined representative value W relevant to pixel values of imaged data obtained by the image reader 26 reading, on the recording medium P, the no-image-recorded region where no image is recorded. Hence, the image reader 26 can be calibrated at appropriate timings by obtaining the representative value W as the reading influence factor on the basis of the reading result of the reading target region 211*b* by the image reader 26. Further, according to this configuration, other than the component to read recording media P, no additional component is needed to detect the reading influence factor, and accordingly downsizing and cost reduction of the inkjet recording device 1 can be realized.

Fifth Modification

Next, a fifth modification of the above embodiment is described. This modification may be combined with any of the first to fourth modifications. This modification is different from the embodiment in that the white plate mover 29 is attached to the image reader 26. Hereinafter, different points from the embodiment are described.

Figure 14A:
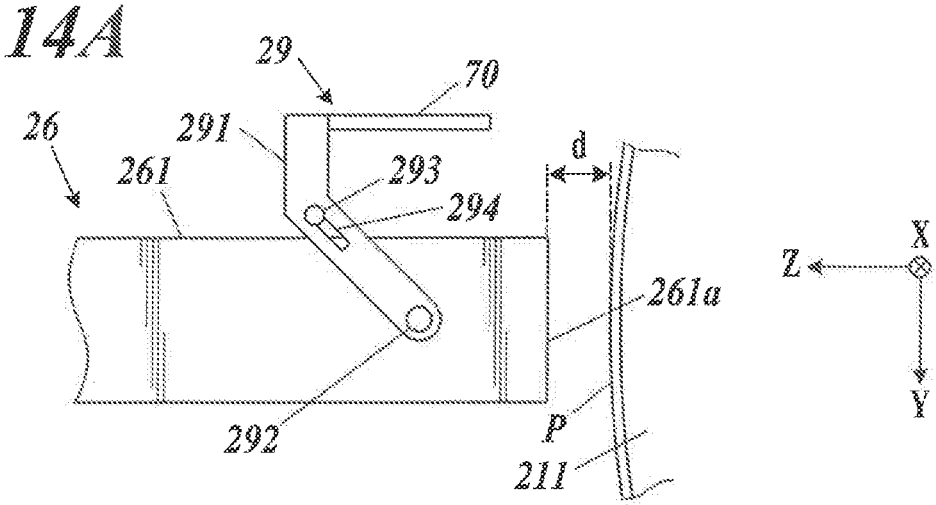
FIG. 14A is a diagram to explain operation of a movement mechanism for the standard white plate according to a fifth modification.
Figure 14B:
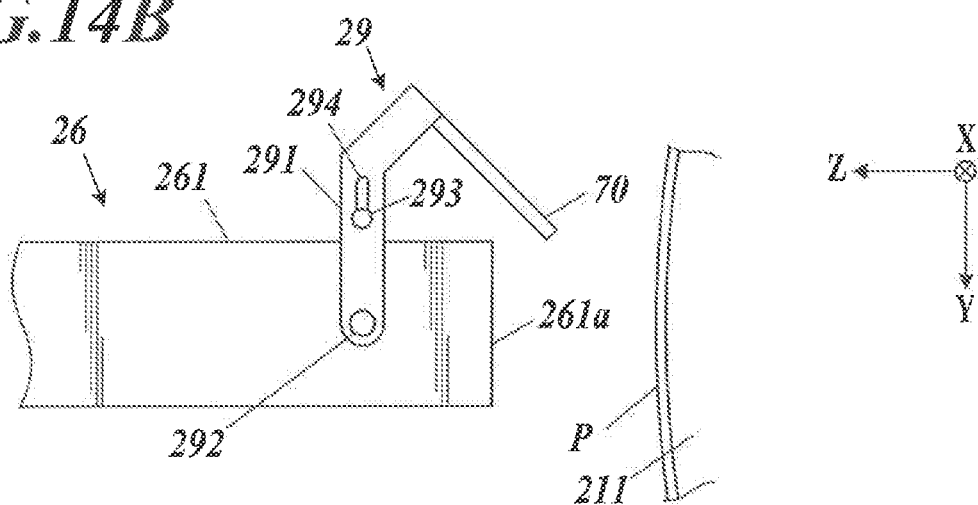
FIG. 14B is a diagram to explain the operation of the movement mechanism for the standard white plate according to the fifth modification.
Figure 14C:
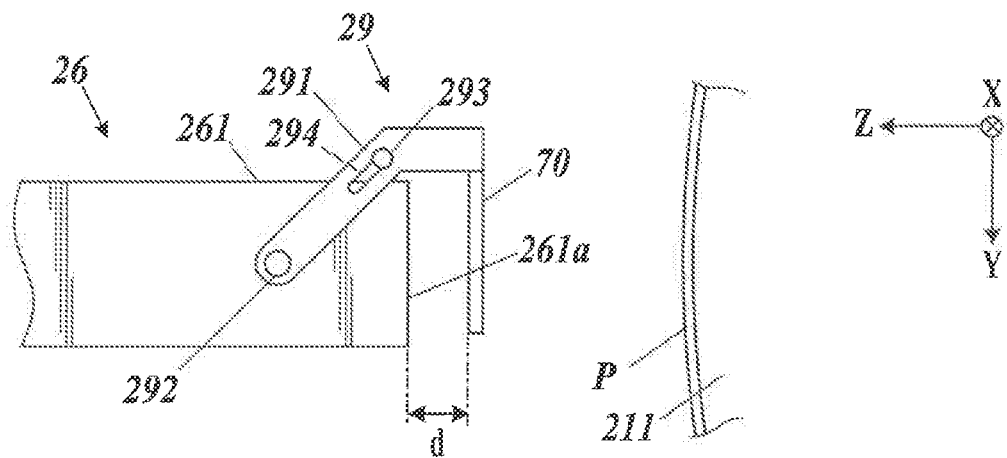
FIG. 14C is a diagram to explain the operation of the movement mechanism for the standard white plate according to the fifth modification.

FIG. 14 are diagrams to explain operation of a movement mechanism for the standard white plate 70 according to this modification. FIG. 14A shows a state in which the image reader 26 is at the recording medium reading position, FIG. 14B shows a state in which the image reader 26 is at a position between the recording medium reading position and the white plate reading position, and FIG. 14C shows a state in which the image reader 26 is at the white plate reading position. To the image reader 26 of this modification, the white plate mover 29 which includes arms 291, rotational shafts 292 and fixing pins 293 is attached.

Of the case 261 of the image reader 26, to two faces perpendicular to the X direction, the plate-shaped arms 291 are attached to be rotatable on their respective rotational shafts 292. The arms 291 are attached to a not-shown frame of the inkjet recording device 1 via their respective fixing pins 293 which are inserted into rounded corner rectangular opening parts 294 provided in the arms 291. Positions of the fixing pins 293 with respect to the rotational shaft of the conveyance drum 211 are fixed. Further, a positional relationship between the case 261 and the fixing pins 293 is adjusted such that when the image reader 26 is at the recording medium reading position, the rotational shafts 292 are on more −Z direction side than the fixing pins 293, whereas when the image reader 26 is at the white plate reading position, the rotational shafts 292 are on more +Z direction side than the fixing pins 293. The short sides, which form a pair, of the rectangular standard white plate 70 are fixed to the other ends of the arms 291, which form a pair, the other ends where the rotational shafts 292 are not attached.

According to this configuration, as the image reader 26 is moved by the reading position adjuster 27 from the recording medium reading position (FIG. 14A) to the white plate reading position (FIG. 14C) in the +Z direction, the arms 291 rotate clockwise on the fixing pins 293 as shown in FIG. 14 while causing the fixing pins 293 to slide inside the opening parts 294, and also rotate clockwise on the rotational shafts 292 with respect to the case 261 as shown in FIG. 14. Further, as the arms 291 rotate, the standard white plate 70 arranged, in the state shown in FIG. 14A, at a predetermined standby position, namely, at a position on more −Y direction side than the case 261 and on more +Z direction side than the light transmission surface 261a, goes around to more −Z direction side than the case 261, and in the state shown in FIG. 14C, is arranged at a predetermined to-be-read position, namely, at a position the standard distance d away from the light transmission surface 261a in the Z direction and facing the light transmission surface 261a. In other words, the standard white plate 70 is attached to the arms 291 so as to be placed at the standby position when the image reader 26 is at the recording medium reading position, and be placed at the to-be-read position when the image reader 26 is at the white plate reading position.

In this modification, as the reading position adjuster 27 moves the image reader 26 from the recording medium reading position to the white plate reading position, the white plate mover 29 moves the standard white plate 70 from the standby position to the to-be-read position. Then, the image reader 26 reads the surface of the standard white plate 70 arranged at the to-be-read position.

Further, the white plate mover 29 may include an arm movement mechanism which translates the arms 291 in the Y direction with respect to the case 261 in the state shown in FIG. 14C, or may include a white plate translation mechanism which translates the standard white plate 70 in the Y direction with respect to the arms 291 in the state shown in FIG. 14C, so that the image reader 26 can read different positions on the standard white plate 70 while the standard white plate 70 is being moved in the Y direction.

Instead of the above configuration, configuration may be provided such that as the white plate mover 29 moves the standard white plate 70, the reading position adjuster 27 moves the image reader 26. Alternatively, configuration to be able to switch between this linkage and no-linkage of the movement of the image reader 26 by the reading position adjuster 27 with the movement of the standard white plate 70 by the white plate mover 29 may be provided.

As described above, the inkjet recording device 1 according to this modification includes: the reading position adjuster 27 which moves the image reader 26 between the recording medium reading position for the image reader 26 to read a recording medium (media) P and the white plate reading position for the image reader 26 to read the standard white plate 70; and the white plate mover 29 which moves the standard white plate 70 to the predetermined position to be read by the image reader 26 as the reading position adjuster 27 moves the image reader 26 to the white plate reading position from the recording medium reading position. Hence, when the image reader 26 reads the standard white plate 70, the standard white plate 70 can be readily arranged at an appropriate position. Further, the mechanism(s) which moves the image reader 26 and the standard white plate 70 can be simplified, and accordingly downsizing and cost reduction of the inkjet recording device 1 can be realized.

The present invention is not limited to the above embodiment or modifications, and can be modified in a variety of aspects.

For example, in the embodiment and the modifications, if the type of an image to be read on a recording medium P is the head adjustment chart 62, the image reader 26 is calibrated. However, the type of an image as the condition to calibrate the image reader 26 is not limited thereto. For example, in the case of configuration to record picture images on recording media P and read the same with the image reader 26, the image reader 26 may be calibrated if the type of an image is a picture image.

Further, in the embodiment and the modifications, as the reading influence factor, the nearby temperature T, the elapsed time t, the brightness B of the LEDs 262a, the representative value V of pixel values of imaged data obtained by the image reader 26 reading the reading target region 211b on the conveyance drum 211, and the representative value W of pixel values of imaged data obtained by the image reader 26 reading the no-image-recorded region on the recording medium P are cited. However, the reading influence factor is not limited thereto. Any factor which affects reading results by the image reader 26 can be the reading influence factor.

Further, in the embodiment and the modifications, in both of the case where the type of an image to be recorded on a recording medium P satisfies the predetermined image type condition and the case where the reading influence factor satisfies the predetermined reading influence factor condition, the image reader 26 is calibrated. Alternatively, the image reader 26 may be calibrated in one of the cases only.

Further, in the embodiment and the modifications, in order that the image reader 26 reads a plurality of lines on the standard white plate 70, the white plate mover 29 moves the standard white plate 70. Alternatively, the standard white plate 70 may be fixed, and the image reader 26 may be moved. Further, the image reader 26 may be calibrated on the basis of imaged data obtained by reading a single line on the standard white plate 70.

Further, in the embodiment and the modifications, the image reader 26 reads the surface of the standard white plate 70 being moved by the white plate mover 29. However, this is not intended to limit the present invention. The image reader 26 may read the standard white plate 70 in a state in which the white plate mover 29 temporarily stops moving the standard white plate 70.

Further, in the embodiment and the modifications, the image reader 26 reads, on the surface of the standard white plate 70, a plurality of lines which are different in position in the Y direction while the standard white plate 70 is being moved in the Y direction. However, this is not intended to limit the present invention. For example, the image reader 26 may read, on the surface of the standard white plate 70, a plurality of lines which are different in range in the X direction while the standard white plate 70 is being moved in the X direction, namely, in a direction parallel to the arrangement direction of the imaging elements 265*a* in the line sensor 265. This reading can readily detect adherence of foreign matters, such as dust, to the standard white plate 70 if the foreign matters adhere to the surface of the standard white plate 70, because in the reading results of the lines, abnormalities due to the foreign matters are present in pixel values of pixels corresponding to different imaging elements 265*a*.

Further, in the embodiment and the modifications, the controller 40 generates the calibration-use image data on the basis of the white plate imaged data, and also calculates the correction value C(i). Alternatively, an information processing device (e.g. the external device 2) provided outside the inkjet recording device 1 may perform at least one of these.

Further, in the third modification, the reflectance of the reading target region 211*b* is uniform. However, if the reflectance of the reading target region 211*b* is not uniform, the image reader 26 may be calibrated as follows. That is, it is possible to obtain data indicating distribution of the reflectance of the reading target region 211*b* and store the same in the storage 44 in advance, and calculate the correction value C(i) so as to correct discrepancy between a reading result(s) of the reading target region 211*b* and the distribution of the reflectance in the X direction of the reading target region 211*b* stored in the storage 44. Further, the reading target region 211*b* may not be white, and may have another color.

Further, in the embodiment, the image reader 26 reads the surface(s) of a recording medium (media) P or the reading target region 211*b* moving by rotation of the conveyance drum 211, and also the head units 24 discharge the inks onto a recording medium (media) P moving thereby. However, this is not intended to limit the present invention. The image reader 26 may read the surface(s) of a recording medium (media) P or the reading target region 211*b*, and the head units 24 may discharge the inks onto a recording medium (media) P, in a state in which the conveyance drum 211 temporarily stops rotating That is, the conveyance operation or conveyance in this specification may include the state in which the conveyance drum 211 temporarily stops rotating, and accordingly no recording medium P is moving.

Further, in the embodiment, the conveyance drum 211 as a conveyance member is rotated to convey recording media P. However, the conveyance member is not limited thereto. For example, it is possible to make a conveyance belt (conveyance member) which is supported by two rollers and moves as the rollers rotate whirl round to convey recording media P. Alternatively, a conveyance member which reciprocates on the same/one plane may convey recording media P. In these cases, the standard white plate may be placed on the conveyance member and conveyed thereby, and the image reader 26 may read a plurality of different lines on the standard white plate being conveyed.

Further, in the third modification, the reading target region 211*b* is provided on the surface of the conveyance drum 211. Alternatively, a reading target region may be provided on a member which does not move according to the conveyance operation. For example, it is possible to provide an opening part in the above conveyance belt, and set and fix a reading target member provided with a reading target region so as to face the image reader via the opening part.

Further, in the embodiment, the inkjet recording device 1 employs a single-pass system. However, the present invention may be applied to an inkjet recording device which record images while performing scanning with a head unit(s). The present invention may also be applied to an inkjet recording device which has a head unit(s) having a single nozzle.

Further, in the embodiment, the inkjet recording device 1 heats the ink(s) which is a gel at room temperature and solates by heat, to be a sol, and discharges the ink(s). However, this is not intended to limit the present invention, and any of various and well-known types of ink including ink which is a sol or a liquid at room temperature may be used.

Further, in the embodiment and the modifications, the piezoelectric inkjet recording device 1, which uses piezoelectric elements, is cited as the image recording device. However, the image recording device is not limited thereto. For example, the present invention is applicable to image recording devices employing various systems. Examples thereof include a thermal inkjet recording device which generates air bubbles in ink by heat and discharges the ink, a dry electrophotographic image recording device which forms images made of toner particles on a photoconductive drum and transfers the images onto recording media, and a wet electrophotographic image recording device which uses not toner particles but liquid toners.

Although some embodiments and the like of the present invention are described, the scope of the present invention is not limited to the above embodiments and the like, but includes the scope of the present invention described in the scope of claims and the scope of their equivalents. The disclosed embodiments are made for purposes of illustration and example only and not limitation. The scope of the present invention should be interpreted by terms of the appended claims.

INDUSTRIAL APPLICABILITY

The present invention is applicable to an image recording device and a method for controlling an image recording device(s).

DESCRIPTION OF REFERENCE NUMERALS

1 Inkjet Recording Device
2 External Device
10 Sheet Feeder
11 Sheet Feeding Tray
12 Media Supply Unit
20 Image Recorder
21 Conveyor
211 Conveyance Drum
211a Conveyance Surface
211b Reading Target Region
22 First Delivery Unit
23 Heater
24 Head Unit
241 Recording Head Drive Unit
242 Recording Head
243 Recording Element
244 Nozzle
245 Attachment Member
25 Fixing Unit
26 Image Reader
261 Case
261a Light Transmission Surface
262 Light Source
2631, 2632 Mirror
264 Optical System
265 Line Sensor
265a Imaging Element
27 Reading Position Adjuster
28 Second Delivery Unit
29 White Plate Mover
291 Arm
292 Rotational Shaft
293 Fixing Pin
294 Opening Part
30 Sheet Receiver
31 Sheet Receiving Tray
40 Controller
41 CPU
42 RAM
43 ROM
44 Storage
44a Image Reader Calibration Data
51 Conveyance Drive Unit
52 Operation Display Unit
53 Detector
531 Temperature Sensor
54 Input-Output Interface
55 Bus
60 Ordinary Image
61 Poor Discharge Detection Chart
62 Head Adjustment Chart
63 Line
70 Standard White Plate
A Reference Surface
P Recording Medium

The invention claimed is:

1. An image recording device comprising:
a recorder which records an image on a recording medium;
a reader which reads, with an imaging element, a surface of the recording medium and a surface of a predetermined reference member, wherein the predetermined reference member is movably attached to the reader and is movable from a first position at which the reader can read the surface of the recording medium to a second position at which the reader can read the surface of the predetermined reference member,
wherein the reader is movable between a recording medium reading position for the reader to read the recording medium and a reference member reading position for the reader to read the reference member, the predetermined reference member being moved with the reader when the reader moves; and
a hardware processor which calibrates the reader for a value to be detected by the imaging element, based on a reading result of the reading of the surface of the reference member by the reader, and
performs the calibration in at least one of: a case where a type of the image to be recorded on the recording medium by the recorder satisfies a predetermined image type condition; and a case where a predetermined reading influence factor which affects a reading result of the reading of the surface of the recording medium by the reader satisfies a predetermined reading influence factor condition.

2. The image recording device according to claim 1, wherein
with a recording element included in the recorder performing a recording operation, the recorder records the image on the recording medium, and
the hardware processor
causes the recorder to record a predetermined test image on the recording medium, the test image being used for detecting a defective recording element which poorly performs the recording operation, and
performs the calibration if the image to be recorded by the recorder is the test image.

3. The image recording device according to claim 2, wherein the hardware processor detects the defective recording element from the recording element based on a reading result of reading of the test image by the reader.

4. The image recording device according to claim 1, comprising a detector which detects the reading influence factor, wherein
the hardware processor performs the calibration if a detection result of the detection by the detector satisfies the reading influence factor condition.

5. The image recording device according to claim 1, comprising an illuminator which emits light of a light emitter to the surface of the recording medium to be read by the reader, wherein
a brightness of the light emitter changes according to a temperature of the light emitter,
the reading influence factor includes a nearby temperature near the illuminator, and
the hardware processor performs the calibration if change in the nearby temperature from predetermined reference time satisfies a predetermined temperature change condition.

6. The image recording device according to claim 1, comprising an illuminator which emits, to the surface of the recording medium to be read by the reader, light of a light emitter a brightness of which changes with time, wherein the reading influence factor includes elapsed time since start of latest light emission by the illuminator.

7. The image recording device according to claim 1, comprising an illuminator which emits light of a light emitter to the surface of the recording medium to be read by the reader, wherein
the reading influence factor includes a brightness correspondence value relevant to a brightness of the light emitter, and
the hardware processor performs the calibration if change in the brightness correspondence value from predetermined reference time satisfies a predetermined brightness correspondence value change condition.

8. The image recording device according to claim 7, comprising a conveyor which conveys the recording medium, wherein
the reader reads the surface of the recording medium being conveyed by the conveyor and a reading target region on a reading target member included in the conveyor,
the illuminator emits the light to the recording medium and the reading target region being read by the reader, and
the brightness correspondence value includes a predetermined representative value relevant to a pixel value of imaged data obtained by the reader reading the reading target region.

9. The image recording device according to claim 8, wherein the conveyor conveys the recording medium by moving the reading target member with the recording medium placed on a placement surface of the recording target member.

10. The image recording device according to claim 7, wherein the brightness correspondence value includes a predetermined representative value relevant to a pixel value of imaged data obtained by the reader reading, on the recording medium, a no-image-recorded region where no image is recorded.

11. The image recording device according to claim 5, wherein the reference time is time of start of the light emission by the illuminator or time of the latest calibration by the hardware processor, whichever is later.

12. The image recording device according to claim 5, wherein the light emitter is an LED.

13. The image recording device according to claim 1, comprising:
a reading position adjuster which moves the reader between the recording medium reading position for the reader to read the recording medium and the reference member reading position for the reader to read the reference member; and
a reference member mover which moves the reference member to the second position to be read by the reader as the reading position adjuster moves the reader to the reference member reading position from the recording medium reading position.

14. A method for controlling an image recording device including a recorder which records an image on a recording medium and a reader which reads, with an imaging element, a surface of the recording medium and a surface of a predetermined reference member, the predetermined reference member being movably attached to the reader and is movable from a first position at which the reader can read the surface of the recording medium to a second position at which the reader can read the surface of the predetermined reference member, comprising:
moving the reader from a recording medium position at which the reader reads the recording medium to a reference member reading position at which the reader reads the reference member, wherein the reference member is moved with the reader when the reader moves;
moving the predetermined reference member to the second position and reading the surface of the predetermined reference member; and
calibrating the reader for a value to be detected by the imaging element, based on a reading result of the reading of the surface of the reference member by the reader, wherein
the calibration is performed in at least one of: a case where a type of the image to be recorded on the recording medium by the recorder satisfies a predetermined image type condition; and a case where a predetermined reading influence factor which affects a reading result of the reading of the surface of the recording medium by the reader satisfies a predetermined reading influence factor condition.

15. The image recording device according to claim 1, wherein the predetermined reference member is attached to the reader by an arm that is rotatably connected to the reader.

16. An image recording device comprising:
a recorder which records an image on a recording medium;
a reader which reads, with an imaging element, a surface of the recording medium and a surface of a predetermined reference member;
a hardware processor which calibrates the reader for a value to be detected by the imaging element, based on a reading result of the reading of the surface of the reference member by the reader; and
an illuminator which emits light of a light emitter to the surface of the recording medium to be read by the reader, wherein
the hardware processor performs the calibration in a case where a brightness correspondence value relevant to a brightness of the light emitter which affects a reading result of the reading of the surface of the recording medium by the reader satisfies a predetermined brightness correspondence value change condition.

17. The method according to claim 14, wherein the step of moving the reader to the reference member reading position and the step of moving the predetermined reference member to the second position are performed simultaneously.

* * * * *